United States Patent
White et al.

(10) Patent No.: US 11,127,076 B2
(45) Date of Patent: Sep. 21, 2021

(54) SESSION-BASED ELECTRONIC TRADING

(71) Applicant: Goldman Sachs & Co. LLC, New York, NY (US)

(72) Inventors: Christopher White, New York, NY (US); Justin Gmelich, New York, NY (US); Dimiter Georgiev, New York, NY (US); Debra Herschmann, New York, NY (US); Paul J. Huchro, New York, NY (US); Wichar Jiempreecha, New York, NY (US); Ross Levinsky, New York, NY (US); John Shaffer, New York, NY (US); Stephanie Miriam Sklar, New York, NY (US); Paul Walker, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 40 days.

(21) Appl. No.: 16/177,421

(22) Filed: Oct. 31, 2018

(65) Prior Publication Data

US 2019/0073718 A1    Mar. 7, 2019

Related U.S. Application Data

(63) Continuation of application No. 13/671,543, filed on Nov. 7, 2012, now abandoned.

(51) Int. Cl.
  *G06Q 40/04*    (2012.01)
  *G06Q 40/06*    (2012.01)

(52) U.S. Cl.
  CPC .............. *G06Q 40/04* (2013.01); *G06Q 40/06* (2013.01)

(58) Field of Classification Search
  None
  See application file for complete search history.

(56) References Cited

U.S. PATENT DOCUMENTS

| | | |
|---|---|---|
| 7,685,057 B2 | 3/2010 | Chiulli et al. |
| 8,108,294 B2 | 1/2012 | Marks De Chabris et al. |
| 2002/0120546 A1 | 8/2002 | Zajac |
| 2003/0216932 A1 | 11/2003 | Foley |
| 2004/0133506 A1 | 7/2004 | Glodjo et al. |
| 2006/0015441 A1 | 1/2006 | Burkhardt et al. |
| 2006/0184445 A1 | 8/2006 | Sander et al. |
| 2007/0150408 A1 | 6/2007 | Camenisch et al. |
| 2007/0219898 A1 | 9/2007 | Burkhardt et al. |
| 2008/0133393 A1 | 6/2008 | Arnold et al. |
| 2008/0249959 A1 | 10/2008 | Mittal et al. |
| 2008/0262957 A1 | 10/2008 | Ford |

(Continued)

OTHER PUBLICATIONS

O'Connell et al., "CNBC Creating Wealth—An Investor's Guide To Decoding The Market," John Wiley & Sons, Inc., 2001, p. 53.

*Primary Examiner* — Joseph W. King

(57) ABSTRACT

An electronic trading method, system, apparatus and platform that facilitate dealer to client trading of financial instruments in a session-based format. In one embodiment, the electronic trading system establishes a trading session for a given financial instrument at a predetermined date and time. The electronic trading system presents a two-sided market and provides a guarantee of a minimum liquidity for the trading session. The electronic trading system then executes client orders based on time of order entry and allocation of available liquidity.

27 Claims, 15 Drawing Sheets

(56) References Cited

U.S. PATENT DOCUMENTS

| | | |
|---|---|---|
| 2008/0270289 A1 | 10/2008 | Petrino |
| 2008/0275808 A1 | 11/2008 | Mackay |
| 2009/0018948 A1 | 1/2009 | Waelbroeck et al. |
| 2009/0024516 A1 | 1/2009 | Waelbroeck et al. |
| 2009/0271291 A1 | 10/2009 | Dreyer et al. |
| 2010/0023458 A1 | 1/2010 | Kociuba |
| 2010/0076887 A1 | 3/2010 | Cushing |
| 2010/0106636 A1 | 4/2010 | Lutnick et al. |
| 2010/0153304 A1 | 6/2010 | Waelbroeck et al. |
| 2010/0205110 A1 | 8/2010 | Wallman |
| 2010/0250425 A1 * | 9/2010 | Sweeting ............... G06Q 40/04 705/37 |
| 2010/0299280 A1 | 11/2010 | Lane et al. |
| 2011/0153488 A1 | 6/2011 | Hirani et al. |
| 2012/0005060 A1 | 1/2012 | Carroll et al. |
| 2012/0005068 A1 | 1/2012 | Burns et al. |
| 2012/0066110 A1 | 3/2012 | Mauro, Jr. |
| 2012/0310813 A1 | 12/2012 | Purpora et al. |

* cited by examiner

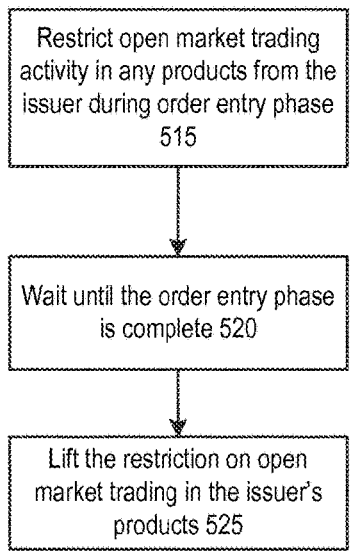
FIG. 5A
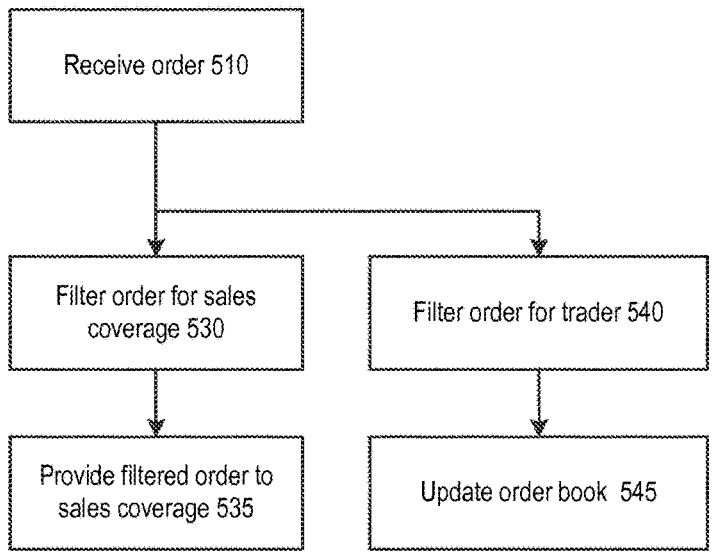
FIG. 5B
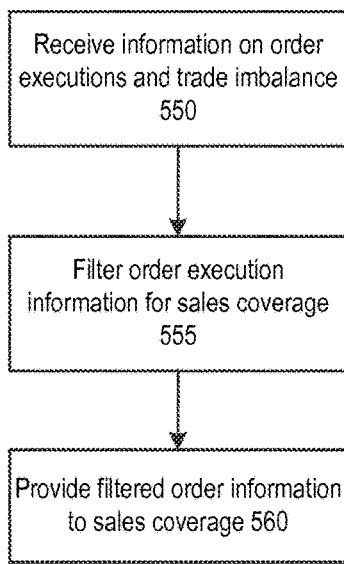
FIG. 5C
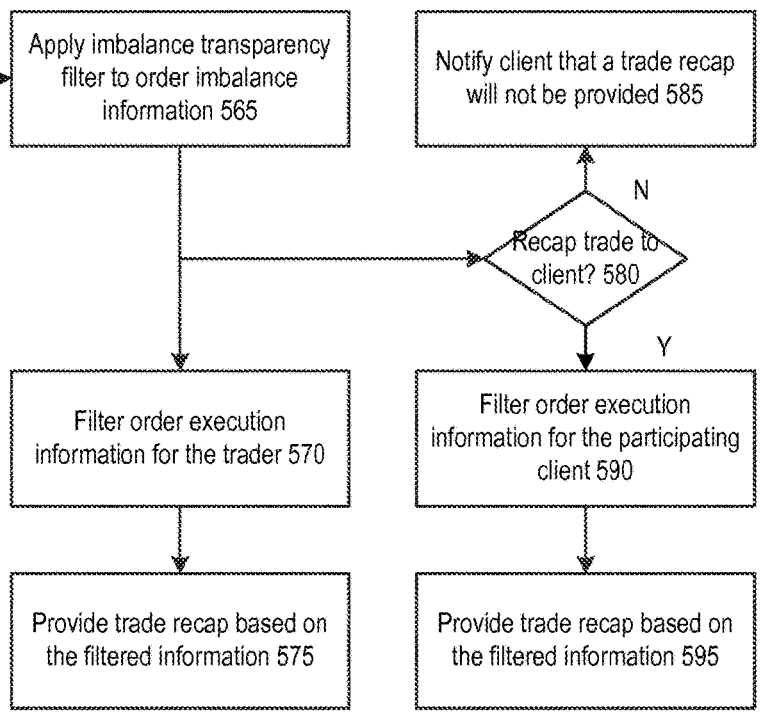

FIG. 7A

| GSessions | | Your GSession Sales Contact \| What is GSessions? \| FAQs \| How to Place an Order |
|---|---|---|
| ● Live | ATT 3 02/15/22 00206RBD3 | |

AT&T Inc.

xxxxxxxxxxxxxxxxxxxxxxxxxxxxxxxxxx
xxxxxxxxxxxxxxxxxxxxxxxxxxxxx

Your order has been entered to BUY 3000M@ 100 vs. T 2.125% 8/15/21 —756 xxxxxxxxxxxxxxxxxxxxxxxxxxxxxxxxxx
xxxxxxxxxxxxxxxxxxxxxxxx

[ Cancel Order ]  00:00:08   xxxxxxx
       752              754

AT&T Inc.

Historical Performance
Period: [1 year ▼]

32 [▂▃▁▄▂] ▲  ⬚ xxxxxxx

| Exec... Time | Size in... | Price | Price... Day | Price... Week | Price... MTD | Yield | Trade Type |
|---|---|---|---|---|---|---|---|
| Feb0... | XX | XXX.XXX | X.XXX▲ | X.XXX▲ | X.XXX▲ | X.XXX | X |
| Feb0... | XX | XXX.XXX | X.XXX▲ | X.XXX▲ | X.XXX▲ | XX.XXX | X |

Upcoming Sessions

| The Goldman Sachs Group, Inc. | Feb 18 |
|---|---| xxxxxxxxxxx
xxxxxxxxxxxxxxxxxxxxxxxxxx

GSessions

Closed | ATT 3 02/15/22 00206RBD3

Your GSession Sales Contact | What is GSessions? | FAQs | How to Place an Order

AT&T Inc.
xxxxxxxxxxxxxxxx
xxxxxxxxxxxxxxxxxxxxx
764 — Your order has been filled 3,000M / 3,000M
Your Fill: BUY $3,000M @ 1100 vs. T 2.125% 8/15/21
768 — Session Recap | Call to spot
766

Trade Recap

AT&T Inc
ATT 3 02/15/22 00206RBD3 — 770

☒ Email  ☐ ✕

| Your Trade: | |
|---|---|
| As of 02/22/12 | |
| NOTIONAL: | $3.0MM |
| SIDE: | BUY |
| CUSIP: | 00206RBD3 |
| PRICE/SPREAD: | 100 |
| SETTLEMENT DATE: | 02/22/12 |
| TRADER: | John Doe (GOLDMAN SACHS) |

| GSession Data: | |
|---|---|
| Total # of Trades: | 9 |
| Total National Traded Volume: | $50MM |
| Imbalance Transparency Setting: | FULL |
| Trade Imbalance: | $21MM (BUY) |

Upcoming Sessions

The Goldman Sachs Group, Inc.
xxxxxxxxxxxx
xxxxxxxxxxxxxxxxxxxxx
xxxxxxxxxxxxxxxxxxx

Pepsico, Inc.
xxxxxxxxxxxxxxxxxxx
xxxxxxxxxxxxxxxxxxx
xxxxxxxxxxxxxxxxx

Morgan Stanley
xxxxxxxxxxxxxxxxxxx
xxxxxxxxxxxxxxxxx

| | Price... Week | Price... MTD | Yield | Trade Type |
|---|---|---|---|---|
| | X.XXX | X.XXX | X.XXX | X |
| | XX.XXX♦ | X.XXX♦ | XX.XXX | X |
| | X.XXX♦ | X.XXX♦ | XX.XXX | X |
| | X.XXX♦ | X.XXX♦ | XX.XXX | X |
| | X.XXX♦ | X.XXX♦ | XX.XXX | X |

SESSION-BASED ELECTRONIC TRADING

BACKGROUND

Existing electronic trading systems facilitate trading between dealers (D2D) D2D trading models in general rely on flow solutions. In a flow solution model, continuous bids and asks are offered throughout a day. Trades occur when bids and asks cross, when a bid or ask is aggressed, or when a response is accepted. Data suggests that electronic trading based on a flow solution model, is suitable for only highly liquid or consistently traded financial instruments. Less liquid or intermittently traded financial instruments have limited or no success in such a flow solution based trading model.

BRIEF DESCRIPTION OF THE DRAWINGS

FIGS. 5A-C are logic flow diagrams illustrating order and execution information handling in an embodiment of the SET system.

FIGS. 7A-D are screenshots illustrating client user interfaces in an embodiment of the SET system.

DETAILED DESCRIPTION

Figure 1:
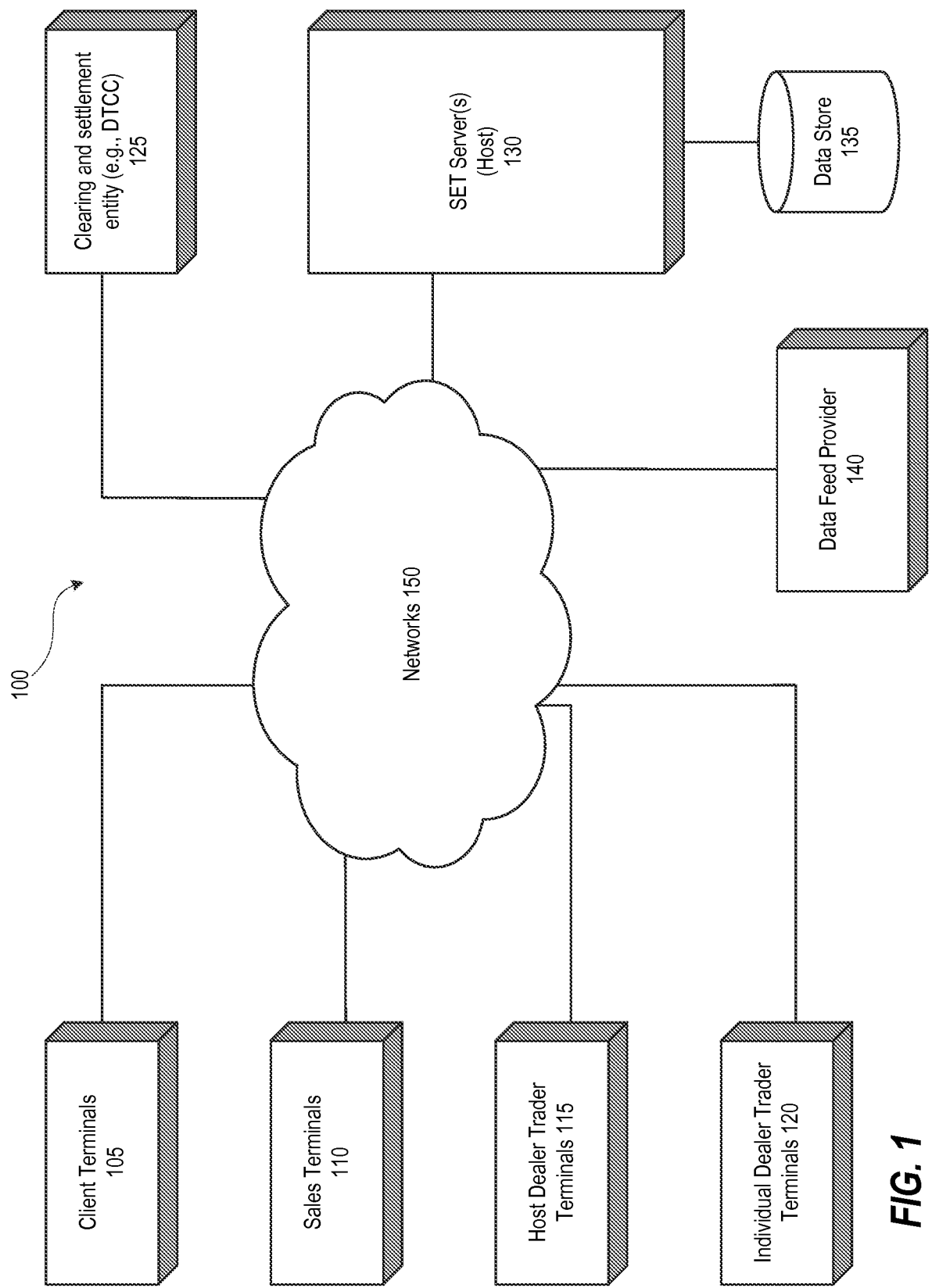
FIG. 1 is a block diagram illustrating an example environment in which the SET system may be implemented.

Various embodiments of session-based electronic trading (hereinafter "SET system") including methods, systems, apparatuses and platforms are described. SET via a SET system facilitates dealer to client (D2C) trading of financial instruments. The SET system may be configured to trade in a variety of financial instruments, including those that are less liquid or infrequently traded, in a session-based format. In the SET system, a temporary executable market is generated. The market that is generated may be a two-sided market, where bid and ask are quoted, or a mid-market, with the spread from the mid at which buy or sell orders can be entered. Once the market is established, participating clients may be allowed a window of time to enter anonymous orders through the SET system user interfaces to trade on the bid or at the offer. At the conclusion of the order entry period, an order fulfillment engine may execute the client orders based on time of order entry and liquidity allocation, and then communicate executions and/or non-executions to the clients, traders and/or other parties. In one embodiment of the SET system, all orders are executed against a dealer of a given financial instrument (e.g., a dealer account). In another embodiment of the SET system, orders from clients are crossed.

The SET system provides clients an alternative solution to address their liquidity needs. In one embodiment, the SET system resolves liquidity dislocation in securities trading by organizing and aggregating client interests in a given security or a group of securities. In another embodiment, the SET system creates scheduled trading sessions that offer a guarantee of minimum liquidity available to trade. The guaranteed liquidity may be representative of the maximum notional risk in terms of size that the dealer or a trader managing the session is willing to take. The guaranteed liquidity in the SET system provides several advantages such as fast and effective order executions over existing trading systems for illiquid or infrequently traded instruments which are generally slow and ineffective.

In yet another embodiment, the SET system aggregates client interests and allows clients to trade very large orders in liquid securities and illiquid or infrequently traded securities, without generating liquidity premiums. In a further embodiment, the SET system allows trading of liquidity (e.g., block liquidity) in a dramatically reduced time at reduced transaction costs.

Various embodiments and implementations of SET system will now be described in terms of a two-sided time limited market for trading US corporate bonds. The SET system, however, is not limited to two-sided markets or trading of US corporate bonds. The SET system may be used to trade various financial instruments including, but not limited to: securities, cash, derivatives, over the counter (OTC) products, and the like. Securities include debt securities (e.g., bank notes, bonds, debentures, and the like), equity securities (e.g., stocks) and derivatives (e.g., futures, options, forwards, swaps, and the like). The SET system may also facilitate trading of various types of bonds including, but not limited to: corporate bonds, mortgage-backed or asset-backed securities, international bonds (e.g., Eurodollar bond), high yield bonds, convertible bonds, exchangeable bonds, and the like. The orders for trading in a financial instrument may be a limit order that specifies an order size, a bid price or an offer (ask) price. It should be noted that price quoted is from a point of view of a trader. A bond has a coupon, maturity, price and yield associated with it. In a bond market, the quoted price of a bond is based on the bond maturity at a price of par or 100.00. A bid is the price a trader will pay for a bond, while an offer or ask is the price at which a trader will sell a bond. The bid-offer spread is the price difference between the price a trader will buy a bond at and the price the trader will sell a bond for. Bond dealers include financial institutions that "make a market" for bonds and provide liquidity for bond investors. Traders are employed by bond dealers to facilitate buying and selling of bonds. For example, traders are knowledgeable about various bonds, and are prepared to quote a price to buy or sell the bonds on behalf of the dealer. Bonds are traded in various sizes. For example, with a bond priced at $1000.00, generally a micro lot is any trade below $100M, an odd lot is any trade greater than a $100M but less than a $1MM, a round lot is anything greater than or equal to a $1MM and less than $5MM and a block is a trade that is $5MM or greater. The SET system may facilitate trading of various types of financial instruments in various sizes.

The following description provides specific details for a thorough understanding and an enabling description of these embodiments and implementations. One skilled in the art will understand, however, that the invention may be practiced without many of these details. Additionally, some well-known structures or functions may not be shown or described in detail, so as to avoid unnecessarily obscuring the relevant description of the various embodiments and implementations. The terminology used in the description presented below is intended to be interpreted in its broadest reasonable manner, even though it is being used in conjunction with a detailed description of certain specific embodiments and implementations of the invention.

Example Environment

The Session Based Electronic Trading (SET) system may be implemented in a suitable computing environment 100, such as the one shown in FIG. 1. Environment 100 may include client terminals 105 operated by clients, sales terminals operated by sales personnel 110, host dealer trader terminals 115 operated by dealer traders and individual dealer trader terminals 120 operated by individual dealer traders that connect to and/or communicate with SET server 130 via networks 150. The SET server 130 may host or have access to various modules and engines of the SET system. In one implementation, the SET system may provide a web-based platform that can be securely accessed via private or public (e.g., Internet) wired or wireless networks such as network 150. In another implementation, the SET system may provide an application or an executable program that can be installed on a computing device or terminal such as a computer, laptop, tablet, smart phone, and/or the like. Clients, sales personnel, host dealer traders and individual dealer traders may each have an account to access respective client, sales and trader user interfaces and facilities provided by the SET system. In one implementation, the SET server 130 may be administered, operated and/or controlled by a bond dealer, for example, Goldman Sachs & Co. of New York. The SET server 130 may connect to or communicate with one or more databases and/or database tables represented by data store 135.

In one implementation, clients may include investors such as Qualified Institutional Buyers (QIBs). Examples of clients include, but are not limited to: financial institutions such as banks and insurance companies, investment funds such as retirement or pension funds, mutual funds and hedge funds, investment advisors, governments and/or the like. In a further implementation, clients may be required to have a sales coverage and/or a trading account (e.g., a corporate bond trading account) with the host dealer in order to participate in trading activities. Clients may also execute an electronic access agreement and/or agree to terms and conditions and any other legal and compliance requirements of the dealer and/or the SET system. In one implementation, sales coverage may include sales personnel responsible for managing client accounts, entering orders on behalf of clients, monitoring orders entered by clients, and/or the like. Host dealer traders (hereinafter "traders") include traders working on behalf of the host dealer. Traders may organize, configure and/or oversee trading sessions. In one implementation, the SET system may provide a private-labeled trading platform to external dealers. Individual dealer traders (hereinafter "individual traders") may include traders working on behalf of such external or participating dealers that utilize the facilities of the SET system to organize trading sessions.

Environment 100 may also include clearing and settlement entities 125. The SET server 130 may connect to and/or communicate with one or more clearing and settlement entities for clearing and settlement of executed trades. Clearing and settlement may include, for example, crediting the buyer's account with bonds and debiting the seller's account. The clearing and settlement may be conducted electronically via entities such as the Depository Trust and Clearing Corporation (DC). In one implementation, environment 100 may also include one or more data feed providers 140 that supply data to the SET system. Examples of data feed providers include Financial Industry Regulatory Authority (FINRA) that provides trade reporting and compliance engine (TRACE) data and other vendors that provide information such as bond quotes, historical data, macro data, and/or the like.

Suitable Systems

Figure 2:
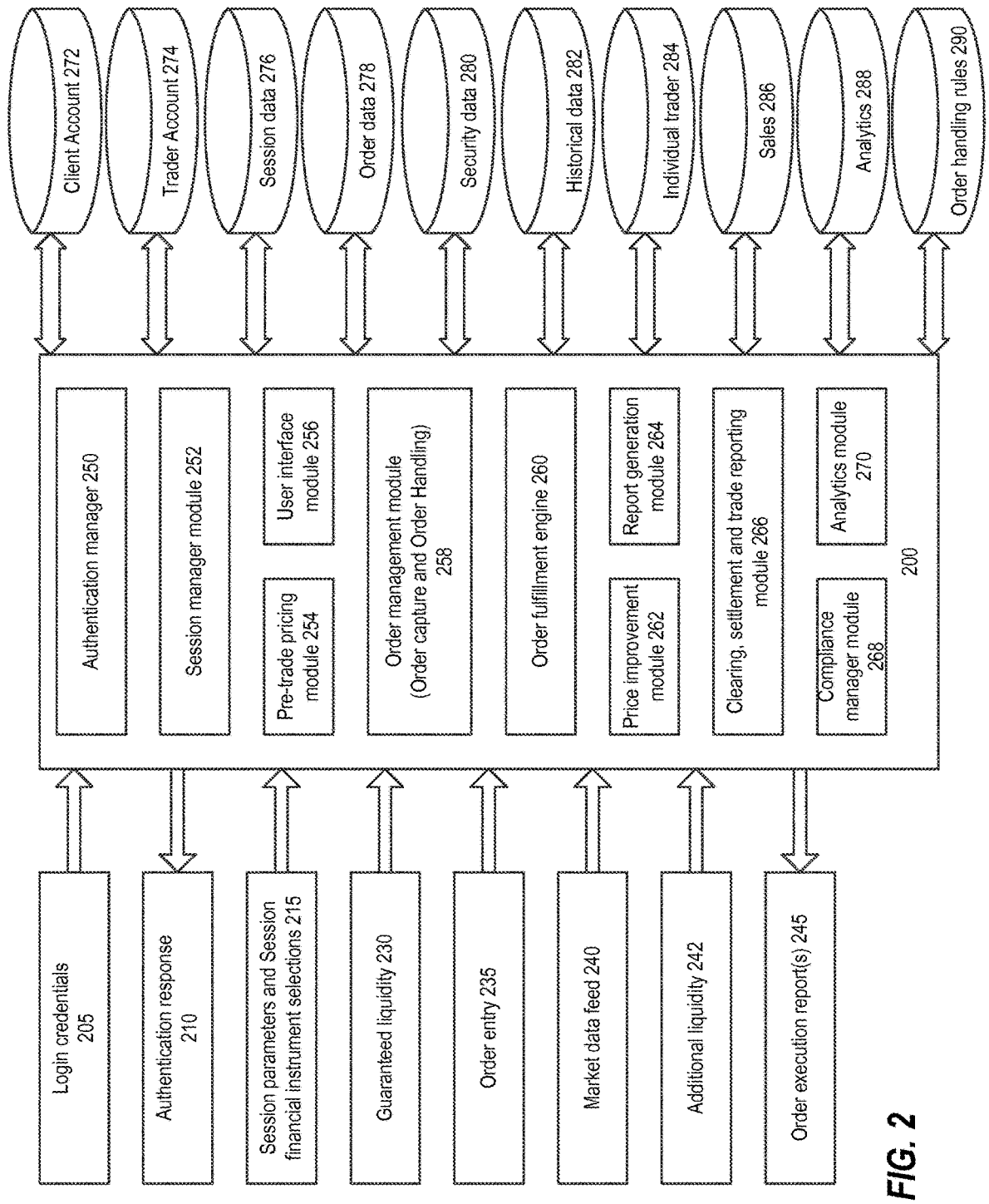
FIG. 2 is a block diagram illustrating an embodiment of the SET system.

FIG. 2 is a block diagram illustrating an embodiment of the SET system. The SET system 200 may receive various inputs (e.g., inputs 205, 215, 230, 235, 240 and 242) and/or other data stored in various database and/or database tables (e.g., 272-290). The input data may be processed by one or more processing modules (e.g., modules 250, 252, 254, 256, 258, 260, 262, 264, 266, 268 and 270) to perform various functions or tasks. The processing modules may generate various outputs (e.g., outputs 210 and 245) from the processing of the input data. Output data including intermediate results may be stored in one or more database tables (e.g., 272-290) and/or may be provided for display in various user interface modules.

In one embodiment, the SET system 200 may include authentication manager 250 for authenticating various users such as clients, traders, sales coverage and individual traders to allow them access to the SET system. The authentication manager 250 may receive login credentials 205 associated with the user and the SET system. The SET system may be accessed directly from a web browser by typing in a web address, via a web portal, a client application installed on a computer or a mobile device such as a smart phone or a tablet, and/or the like. The login credentials may include information such as, but not limited to: a username, a password, a personal identification number (PIN), biometric information, and/or the like that can be used to uniquely identify the user. The authentication manager 250 may receive the login credentials and determine whether to allow or deny the user access to the SET system. The authentication manager 250 may access various database tables such as client account table 272, trader account table 274, individual trader table 284, sales table 286, and/or the like to retrieve data for authentication. Any of the authentication methods and protocols available in the art may be utilized. After performing authentication, the authentication manager 250 may generate an authentication response 210, allowing or denying the user access to the SET system.

The SET system may include a session manager module 252 for configuring, managing and/or operating a trading session. In one implementation, session parameters and financial instrument selection may be provided as an input 215 to the session manager module 252. Session parameters may include various parameters for configuring a trading session. Session financial instrument selections may include financial instruments or securities selected for trading in the trading session. The trading session may be used for trading in one security or more than one security. The security may or may not be from the same issuer. Data relating to the security, such as a security identifier (e.g., CUSP number), TRACE data and/or other details may be obtained from one or more database tables such as the security data table 280, the historical data table 282, and/or from the market data feed 240. Upon configuring the trading session, the session manager 252 may publish certain details of the trading session, such as date and time, selected security, data and links to content for the issuer of the selected security, and/or the like. The session manager 252 may also receive a guaranteed liquidity amount 230 for a trading session. The guaranteed liquidity amount is a minimum notional value that is guaranteed to be available for execution in a given session. The guaranteed liquidity amount may be specified by a trader organizing the session. The session manager 252 may also include facilities for initiating a trading session at the predetermined date and time and running the session for a predetermined duration. The session manager 252 may further initiate and operate for a predetermined duration, an order collection phase of the session. In one implementation, the session parameters, the security selections and the guaranteed liquidity amount may be stored in one or more database tables such as the session data table 276.

In one embodiment, the SET system may include a pre-trade pricing module 254. In one implementation, the pre-trade pricing module 254 may determine, using historical data (e.g., from the historical data table 282), the market for the trading session. In other words, the pre-trading pricing module may determine the bid/ask prices and spreads for a security selected for trading in a trading session. Alternatively, a trader running the session may supply pricing parameters for the two-sided market to the session manager module. The pre-trade pricing parameters for a session may be stored in association with an identifier for the session in one or more database tables such as the session data table 276.

The SET system may include a user interface module 256 that generates client, sales, trader and individual trader graphical user interfaces for order entry, order monitoring, reporting, and so forth. Example graphical user interfaces generated by the user interface module are discussed in detail with respect to FIGS. 7A-D, 8A-B and 9A-B.

In one embodiment, the SET system includes an order management module 258 that facilitates order capturing and order handling. The order management module may receive order entry 235 from clients during a window of time allotted for submitting orders. The order management module 258 may also receive and accept cancellations of submitted orders during an allotted window of time. Any orders placed or cancelled outside of the allotted window of time for order entry and order cancellation respectively, may be rejected. The order management module 258 handles the orders based on one or more order handling rules and in a manner that is consistent with regulatory and other compliance guidelines and/or requirements. Details of the order handling rules are discussed with respect to FIGS. 4 and 5A-C. The order management module 258 may store order data in one or more database tables such as the order data table 278. The order management module 258 may also communicate order data that has been processed (e.g., filtered) or handled according to the order handling rules to the user interface module 256 for display in various user interfaces for traders, sales and/or clients. In one implementation, the order management module 258 may also process or handle execution data before they are made available for dissemination to traders, sales and/or clients. The order management module may also communicate with the order handling rules database table 290 to retrieve order handling rules for processing order data and execution data.

The SET system includes an order fulfillment engine 260 that executes orders based on an order fulfillment algorithm. In one embodiment, the order fulfillment algorithm may be based on time priority and liquidity allocation such that the time of order entry and size of order are both equally or substantially equally rewarded. The order fulfillment engine 260 may receive order entry 235 directly or through the order management module 258. The order fulfillment engine 260 may also receive the guaranteed liquidity amount directly or through the session manager module 252. Furthermore, in some implementations, depending on order interests received from clients, liquidity amount 242, in addition to the guaranteed liquidity 230, may be provided to the order fulfillment engine 260. In one implementation, the additional liquidity amount 242 may be added at any time during the order entry period. In another implementation, the additional liquidity amount 242 may be added up to a few seconds (e.g., 15 seconds) after the conclusion of the order entry phase. The additional liquidity amount 242 may be used to reduce resulting order imbalances, to increase the aggregate session execution volume, and/or the like. The order fulfillment engine 260 may then execute or fill orders based on time priority and/or allocation of liquidity, including contra-side liquidity, the guaranteed liquidity amount and in some cases, additional liquidity amount, or a combination thereof. Details of the order fulfillment engine 260 are disclosed in co-pending application titled "Order Fulfillment Method and System," the entire content of the aforementioned application is herein expressly incorporated by reference. In alternate embodiments, the order fulfillment algorithm may be based on time priority or pro-rata.

In one embodiment, the SET system may include a price improvement module 262 that allows for execution of trades at a better price depending on the order interests in a trading session. The price improvement module 262 may monitor the order interests, and if the risk to the dealer is at an acceptable level (e.g., no risk or risk below a threshold), the module 262 may adjust the market such that, from a dealer perspective, buy orders are executed at a higher price and sell orders are executed at a lower price, providing savings to clients at either side of the trade. The price improvement module 262 may access data from and store data into one or more database tables such as the session data table 276 and/or the order data table 278.

In one embodiment, the SET system may include a report generation module 264 that may receive data from other modules such as the order management module 258, order fulfillment engine 260 and price improvement module 262 and/or one or more database tables. The report generation module 264 may process the received data, and generate a report using a template. The template may be specific to the entity for which the report is being generated. The template may also include rules for including specific types or fields of information and formatting instructions. An example report may be a trade execution report for a client. Reports may be generated in various formats such as Excel, Word, Portable Document Format (PDF), or any other format that can be processed and viewed using various applications on a user device. Reports may also be accessible from various user interfaces for viewing, printing, emailing, downloading, sharing and/or the like.

In another embodiment, the SET system may include a clearing, settlement and trade reporting module 266 that may be configured to receive execution data from the order fulfillment engine 260, and/or other database tables (e.g., 276 and 278) and process and provide such data to clearing and settlement entities (e.g., 125) such as the DC. In a further embodiment, the SET system may also include a compliance manager module 268 that may include rules and/or guidelines for running a trading session, order handling, clearing, settlement and reporting, and/or the like. In one implementation, the compliance manager module 268 may monitor a trading session, market data feed contents 240, events in the external market and so on to generate triggers or recommendations under certain conditions. For example, if the market level quoted for a session becomes "off market" as a result of external market moving events, the module 268 may generate a recommendation to the trader to cancel the trading session or take other predefined measures. In one implementation, a trading session may be cancelled during the order entry phase.

The SET system may also include an analytics module 270 that gathers and analyzes data from executions (filled, partially filled and unfilled orders) and inquiries relating to a session, macro data, market conditions, recent new issue headlines, client feedback, and/or the like. The analytics module 270 may also aggregate data from multiple sessions, track changes in the trading session markets over time, track execution activity (e.g., volume) changes over time, and/or the like. Data from the analytics module 270 may be used for various purposes including identifying opportunities for trading and managing risk. For example, based on analysis of execution data and order interest level, the analytics module may assist in identifying a trading opportunity in a financial instrument or suggest increasing or decreasing guaranteed liquidity amount to adjust risk to the dealer. The analytics module 270 may receive data from and store data into one of more database tables such as the analytics table 288, the historical data table 282, the order data table 278, the session data table 276, and/or the like.

As discussed above, various modules may connect to and/or communicate with one or more database components 272-290 of the SET system. Each database component (e.g., database table) may include various fields of data. For example, the client account database table 272 may include data fields such as, but not limited to: client name, client identifier, login credentials, address, preferences, funding information, trading account identifier, trading account details, and the like. The trader account database table 274 may include data fields such as, but not limited to: trader name, trader identifier, login credentials, contact information, and the like. The session data table 276 may include data fields such as, but not limited to: session identifier, security identifier, bid, ask, spread, improved bid, improved ask, savings, participant identifier, minimum order size, minimum increment size, quote method, fill type, trader identifier, dealer identifier, and/or the like. The order data table 278 may include data fields such as, but not limited to: order identifier, session identifier, order size (or trade volume), security identifier, security description, trade side, and/or the like. The security data table 280 may include data fields such as, but not limited to: security identifier (e.g., CUSP), security name, issuer, related securities, category, type, class, sub-class, current price, price source, coupon, maturity, price, yield, and/or the like. The historical data table 282 may include data fields such as, but not limited to: security identifier, TRACE data fields (e.g., execution size, price, change in price over a day, change in price over a week, change in price over a month, yield, trade type, execution time), and/or the like. The individual trader table 284 may include data fields such as, but not limited to: dealer identifier, individual trader identifier, session identifier, dealer name, account information, and/or the like. The sales table 286 may include data fields such as, but not limited to: sales person identifier, name, contact information, client identifier, session identifier, order identifier, and/or the like. The analytics table 288 may include data fields such as, but not limited to: session identifier, security identifier, buy interest, sell interest, execution volume, unfilled order volume, and/or the like. The order handling rules table 290 may include data fields such as, but not limited to: rule identifier, entity type, allowed order data fields, restricted order data fields, allowed execution data fields, restricted execution data fields, imbalance data setting, and/or the like.

It should be noted that in some implementations, one or more modules described above may be consolidated into a single module. In some instances, implementation of one or more of these modules may be made optional. Similarly, one or more of the database tables may be consolidated into a single database table.

Trading Session Configuration

Figure 3A:
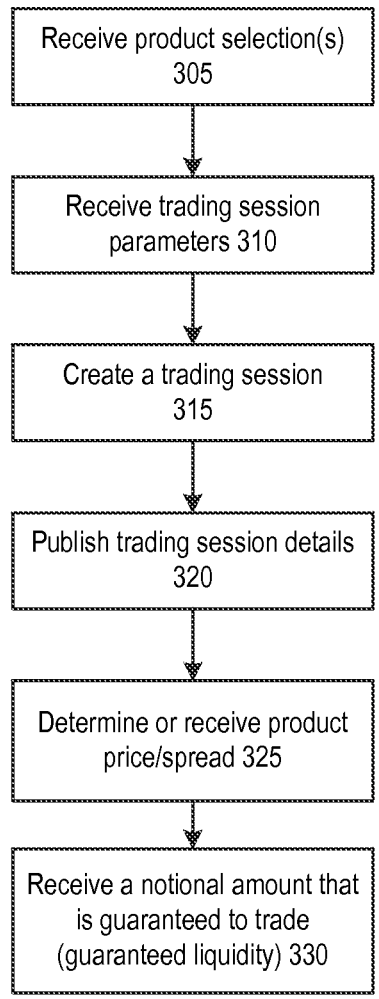
FIG. 3A is a logic flow diagram illustrating a trading session configuration in an embodiment of the SET system.

FIG. 3A is a logic flow diagram illustrating configuration of a trading session in one embodiment. In one implementation, the SET server may receive a selected security for trading in a trading session at block 305. The SET server may also receive trading session parameters at block 310. Trading session parameters may include, but are not limited to: session duration, session date and time, minimum order size, minimum order increment size, fill type, and/or the like. Each session may be uniquely identified by a session identifier. At block 315, the SET server may create and/or configure a trading session based on the received parameters including the selected security. A trading session may be created and/or configured ahead of time and details of the upcoming trading session may be published at block 320. For example, the SET platform calendar may publish a schedule of upcoming trading sessions, as well as any trading sessions added throughout each day. The calendar may be viewed by users once they log in to the SET trading platform. In one implementation at block 325, before the trading session starts, the SET server may determine, or receive, price and spread information for the security selected for trading in the trading session. In another implementation, a trader may provide the mid-market data for the selected security and the spread from the mid at which buy or sell orders can be placed. In one implementation, the spread for the trading session may be changed up until a predefined time (e.g., 15 seconds) prior to the start of the session.

In one embodiment, the SET trading system may allow a trader managing the session to guarantee up to a notional amount for trading at the market defined by the trading session. When the liquidity is guaranteed, the SET system is obligated to provide liquidity up to the guaranteed notional amount even when there is only one-sided interest or when there is not enough counter liquidity. For example, if a trading session that has a $25MM guaranteed liquidity, receives a $40MM buy interest, and no sell interests, the SET system is obligated to provide up to $25MM in sell interest to ensure that at least $25MM is generated in execution. In this example, the guaranteed liquidity comprises dealer liquidity, since the dealer provides the entire amount of the guaranteed liquidity for execution. By way of another example, if a trading session that has a $25MM guaranteed liquidity receives a $10MM buy interest and $40MM in sell interest, the SET system is obligated to provide up to $15MM in buy interest to ensure that at least $25MM is generated in execution. In this example, the guaranteed liquidity is a combination of contra liquidity ($10MM) and dealer liquidity ($15MM). In embodiments, where there is enough liquidity from buy and sell order interests to generate an amount guaranteed to trade in the session, the SET system is no longer obligated to provide any liquidity. For example, if a trading session that has a $25MM guaranteed liquidity, receives a $30MM in buy interest and $40MM in sell interest, the SET system has no obligation to provide any liquidity since the two-sided order interests exceed $25MM. In one embodiment, the SET system may provide the trader managing the session an option to inject additional liquidity to the session to reduce any trade imbalances.

At block 330, the SET server may receive a guaranteed liquidity amount for the trading session. In one embodiment, the notional amount guaranteed for the trading session may be determined based on dealer risk, security characteristics, aggregated execution data and/or the like. The guaranteed liquidity amount may be provided by the trader of the trading session in one embodiment. In an alternate embodiment, the guaranteed liquidity amount may be determined by, for example, the analytics module 270. In one implementation, the guaranteed liquidity amount may be a session parameter that is received at block 310 and may be set ahead of the scheduled trading session. In another implementation, the guaranteed liquidity amount may be displayed on the trading session window or panel in advance of or at the start of the trading session. The mid-market and the spread may be displayed on the trading session window or order entry panel of client user interfaces when the trading session is released at the predetermined date and time.

Figure 3B:
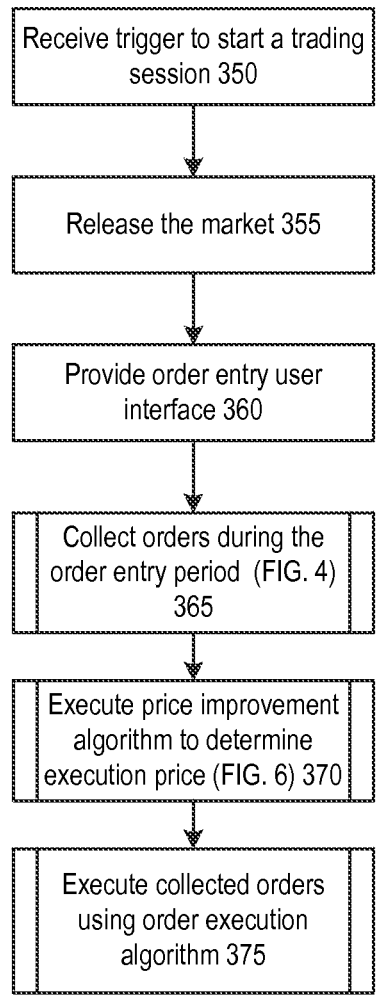
FIG. 3B is a logic flow diagram illustrating a trading session operation in an embodiment of the SET system.

FIG. 3B is a logic flow diagram illustrating trading session operation in one embodiment. At block 350, the SET server may receive a trigger to start a trading session. The trigger may be generated at the time the trading session is scheduled to begin. At the scheduled time, at block 355, the SET server may release the market. At block 360, the SET server may provide or activate an order entry graphical user interface (GUI) for clients, and in some implementations, sales coverage, to enter their orders. Before the market is released, clients may only see certain trading session information such as the security description including security identifier and issuer information, guaranteed liquidity, and/or the like. The market information such as the mid-market price and the spread may be released only at the start of the trading session. The order entry GUI may also include a timer that displays the time remaining to enter an order in the trading session. In one implementation, one order per client may be allowed. At block 365, the SET server may collect orders from clients participating in the trading session. The orders may be collected during the order entry period. The order entry period may be fixed (e.g., a default order entry period of 5 minutes) or configurable by the trader. Details of order collection are discussed with respect to FIG. 4. In one embodiment, as the SET server aggregates order interests from participating clients, a price improvement algorithm may be executed at block 370 to determine if the execution price can be improved and if so, to determine the improved execution price. Details of the price improvement algorithm are discussed with respect to FIG. 6. The SET server may then execute the collected orders based on an order fulfillment algorithm, such as the one implemented by order fulfillment engine 260, at the initial or improved execution prices at block 375.

Order Capturing and Handling

Figure 4:
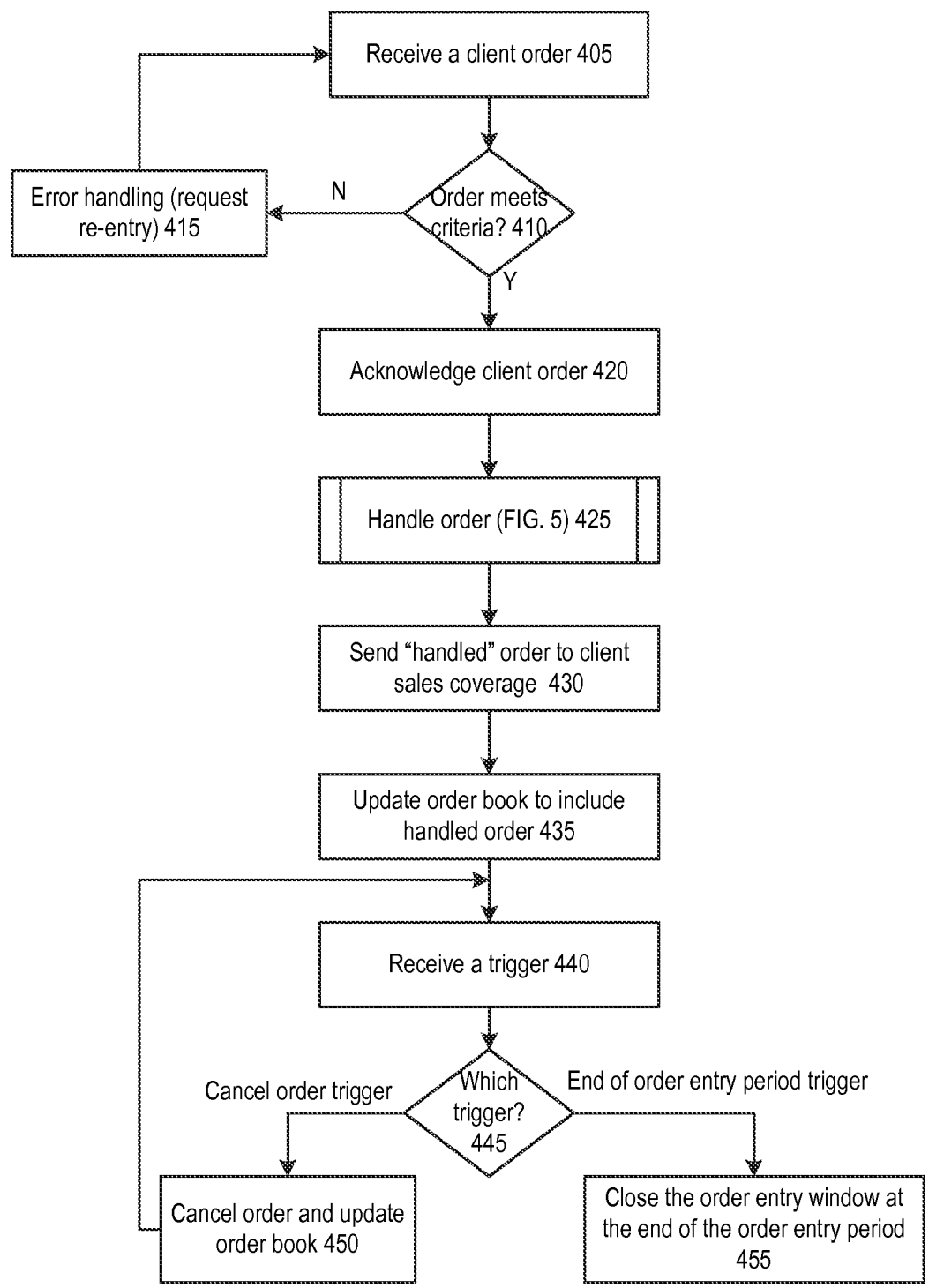
FIG. 4 is a logic flow diagram illustrating order capture and handling in an embodiment of the SET system.

FIG. 4 is a logic flow diagram illustrating order capture and handling in one embodiment. During the order entry period, a client may enter and submit an order using an order entry GUI such as the one shown in FIG. 7B. The order may be received by the SET server at block 405. The received order may include information such as, but not limited to: an order identifier, a security identifier, desired order execution side (buy or sell), quantity, fill type, bid price, ask price, and/or the like. At block 410, the SET server may determine whether the order meets certain criteria such as minimum order size and increment size. If the order does not meet all of the order criteria, error handling procedure may be invoked at block 415. For example, the SET server may request the client to re-enter the order to comply with the order criteria. The order criteria may be evaluated client-side or server-side. Conversely, if the order submission meets the order criteria at block 410, the SET server may accept the order and acknowledge the order at block 420. The acknowledgement may be in the form of a message or notification displayed on the client user interface. In one implementation, the client user interface may display the time remaining for canceling the order.

At block 425, the SET server may handle the order according to order handling procedures which are discussed in detail with respect to FIG. 5. Some of the order handling procedures may be specific to the party or entity to which information relating to the order is to be delivered. For example, at block 430, the SET server may communicate the order information that has been processed or handled to the sales coverage. At block 435, appropriately handled order information may be used to update an electronic order book that can be accessed by the trader managing the session. In one implementation, the order book may be a table, a stack or a listing including all orders that have been collected from various clients participating in the trading session. The order book may include only those fields of order information that are approved for communication to the trader (e.g., by the order management module 258). At block 440, the SET server may receive a trigger. The trigger may be a request from the client to cancel the order or a trigger indicating the end of the order entry period. In one implementation, a client may cancel an order any time prior to, but not after, the conclusion of the order entry period. If the trigger at decision block 445 is a cancel order trigger from the client, the SET server may cancel the order and update the order book at block 450. In one implementation, SET server may then wait for a new order from a client, or wait for the end of the order entry period. Conversely, if trigger at decision block 445 is a server side trigger generated when the order entry period is over, the SET server may conclude the order collection phase at block 455 by removing or inactivating the order entry GUI from the client user interface of the SET system.

FIGS. 5A-C are logic flow diagrams illustrating order handling. Order handling protocols implemented on the SET system select certain fields of order information for delivery to a recipient. For example, when a client places a large order, and subsequently cancels the order or the order does not get filled, the order handling protocols in place prevent leakage of such information to other parties including traders, sales coverage and other participating clients.

In addition to the order handling rules which are discussed in detail with respect to FIGS. 5B and 5C, the SET server may include legal and compliance protocols that are enforced prior to, during and/or after the trading session. For example, in one implementation, one such protocol may be the restriction on any exchange of information relating to the trading session between the sales coverage and the traders. In another implementation, referring to FIG. 5A, an order handling rule may include restricting open market trading activity in any securities issued by an issuer of the security that is being actively traded in a trading session at block 515. For example, an AT&T trading session may be in progress. During the order collection phase of the AT&T trading session, trading of the particular CUSIP, any other AT&T bonds, AT&T credit default swaps (CDS), AT&T loans, AT&T loan credit default swaps (LCDS), and/or the like may be restricted. At block 520, the SET server may wait until the order entry or collection phase is over to lift the restriction on open market trading in the issuer's security at block 525.

Referring to FIG. 5B, an order handling protocol may include processing of order information received from clients for delivery to entities such as the client's sales coverage and the trader running the session. At block 510, the SET server may receive an order. The received order may be parsed to extract details of the order. For example, an order may include information such as an order identifier, client identifier, security identifier, security description, order size, buy or sell side, bid/ask price, and/or the like.

In one implementation, at block 530, the SET server may filter the order for transmission to the sales coverage according to one or more order handling rules. An example order handling rule may require filtering or removal of buy or sell side information and order size information when the recipient of the order information is a sales coverage for the client account. Another example order handling rule may specify that the sales coverage can receive order information relating to his or her clients only. At block 535, the SET server may provide the filtered order information to the sales coverage, such that the sales coverage may see his or her client participating in a trading session, but not the details such as the buy or sell side and the order size of the client's order. In instances where the sales person is the one entering an order on behalf of the client, the sales person may see full details of the order.

In another implementation, at block 540, the SET server may filter the order for transmission to a trader managing the trading session according to one or more order handling rules. Since the trader is managing the session, the trader may receive at least some information on all the orders collected from participating clients during the order entry phase. The order information may be filtered using one or more order handling rules to remove certain details. An example order handling rule may require filtering or removal of information identifying the client, such as the client name, client identifier, and/or the like when the recipient of the order information is a trader managing the session. At block 545, the filtered order information may be communicated to the trader user interface (e.g., order book). As the filtering performed at block 540 removes name attributions from the order information, the trader may see the details of the order such as order size and side, but not the name of the client who placed the order.

In one embodiment, order handling may also include order execution information handling. At the conclusion of a trading session, information on order executions (fill or partial fill), order imbalance and unfilled orders may be processed according to one or more order handling rules prior to providing the execution information to participating clients, sales coverage for the clients and a trader managing the session. Referring to FIG. 5C, the SET server may receive execution information on orders and trade imbalance at block 550. At block 555, the SET server may filter the received execution information using one or more order handling rules for distribution to the sales coverage. An example order handling rule may require filtering or removal of size and side details of any unfilled orders when the recipient of the information is a sales coverage. Another example order handling rule may allow execution information relating to filled and partially filled orders only to be communicated to the sales coverage. At block 560, the filtered information may be provided to the sales coverage.

In one implementation, the order imbalance information may be subjected to an imbalance transparency filter that is configured by a trader and may be published along with other trading session details before the start of a trading session. The transparency filter may have two settings, exact net imbalance or full setting and capped net imbalance setting. When the exact net imbalance setting is selected, the transparency filter may allow information relating to the size and side of net imbalance (e.g., $50MM sell) to be communicated. Conversely, if the capped net imbalance setting is selected, the transparency filter may allow information relating to the net imbalance greater than a predetermined capped level (e.g., >$25MM) to be communicated. At block 565, the SET server may apply one of the two settings for imbalance transparency filter to the order imbalance information. At block 570, the SET server may filter the order execution information for a trader managing the session according to one or more order handling rules. An example order handling rule may allow information with attribution (e.g., client name) on the executed orders, whether they are fully filled or partially filled to be communicated to a trader managing the session. Another example order handling rule may require filtering or removal of details relating to any unfilled orders when the recipient is a trader managing the session. At block 575, the SET server may provide a trade recap to the trader based on the filtered information. For example, the trade recap provided to the trader may include information relating to the clients that traded in the session (e.g., number of clients), total volume of trade and order imbalance information subject to imbalance transparency settings, and the like.

At the conclusion of the trading session, participating clients may also receive a trade recap including information on order executions and order imbalances. In one implementation, at block 580, the SET server may determine if a trade recap is to be provided to a participating client. In one implementation, participating clients that receive executions and clients that have unfilled block-sized orders may qualify to receive a recap of the trading session activity. If the client does not qualify for a trade recap, the client may be provided a notification at block 585. Conversely, if the client qualifies for a trade recap, order execution information may be filtered according to one or more order handling rules at block 590. An example order handling rule may require communicating to the client execution results corresponding to his or her order. At block 595, a trade recap based on the filtered information may be provided to the client. In one implementation, the trade recap provided to the client may include information on the number of trades, the total volume traded in the session and information on the resulting order imbalance information subject to the imbalance transparency settings.

Price Improvement

The SET system defines a temporary two-sided market for trading in a security. The market is released at the beginning of the trading session, and participants may enter their orders against these levels, with the assurance that if filled, the orders will be executed against the defined market levels or better. Even if only one participant were to show up for a trading session, the liquidity guaranteed by the trading session would allow execution of the participant's order at the defined market level up to the notional amount guaranteed by the trading session. The guaranteed liquidity, in other words, is a risk assumed by a trader/dealer in a trading session. In some implementations, depending on the order interests from participating clients, the risk from guaranteeing a liquidity amount may be reduced or eliminated. In such situations, the SET server may allow execution of orders at improved market levels rather than the initially established prices.

Figure 6:
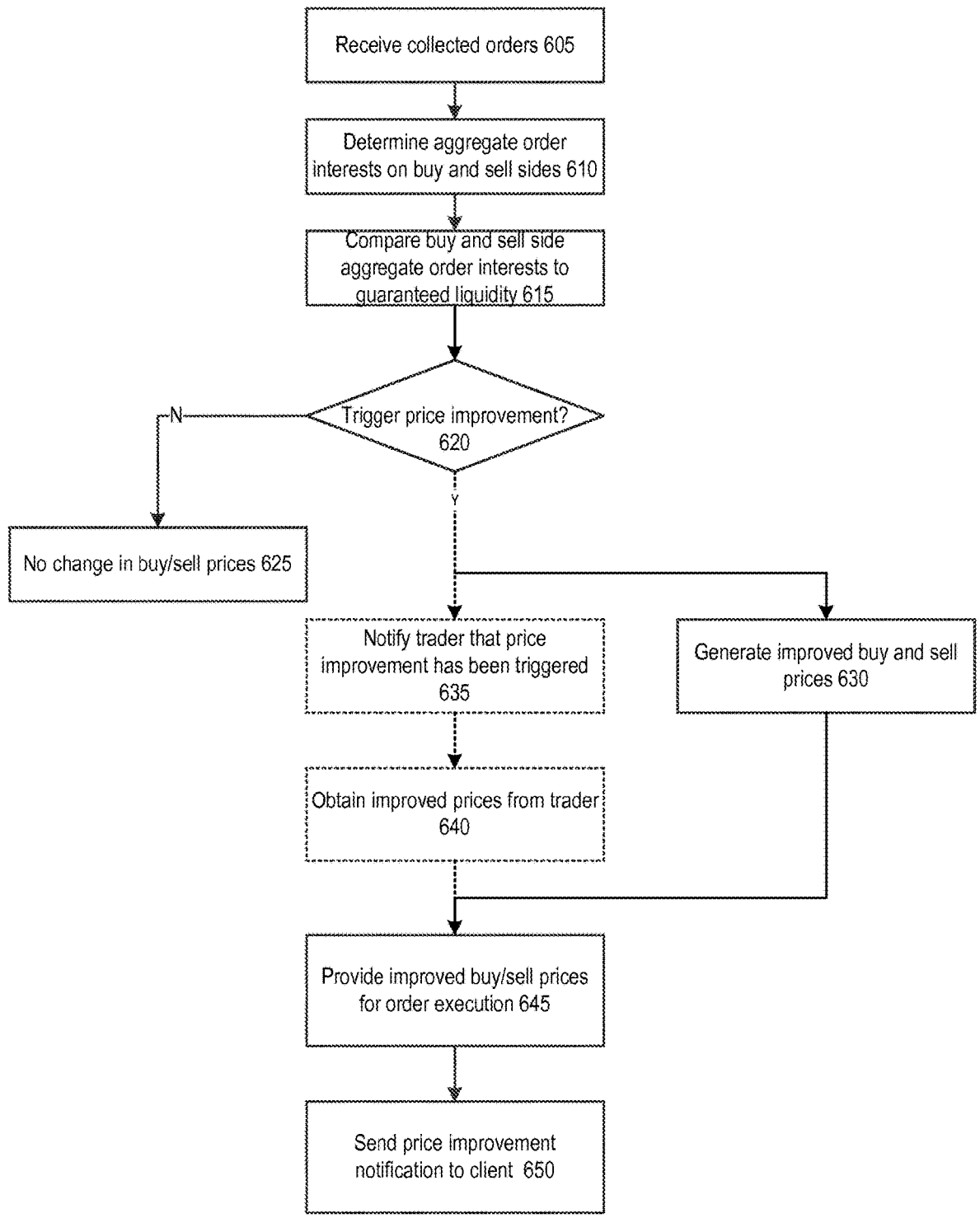
FIG. 6 is a logic flow diagram illustrating price improvement in an embodiment of the SET system.

FIG. 6 is a logic flow diagram illustrating price improvement. At block 605, the SET server may receive orders as they are being entered. At block 610, the aggregate order interests for the buy side and the sell side may be determined. At block 615, the aggregate order interests on the buy and sell sides may be compared to the liquidity guaranteed for the trading session. At block 620, based on the comparison, the SET server may determine whether to trigger price improvement. Price improvement may be triggered if the aggregate order interest on the buy side and the aggregate order interest on the sell side at least equal the guaranteed liquidity amount.

For example, a session may aggregate $20MM in buy interest and $15MM in sell interest, and the session may provide a guaranteed liquidity in the amount of $10MM. In this example, the session has managed to generate a two-sided liquidity of $15MM which exceeds the guaranteed liquidity amount of $10MM. The SET server is then no longer obligated to provide the guaranteed liquidity. Since the SET server can complete trades of at least $15MM for clients on both sides without using its balance sheet, the risk to the dealer from the trading session can be reduced or eliminated. Such pattern of two-sided interest that leads to reduced risk may trigger price improvement. Improved prices result in savings to clients on both buy and sell sides. For example, from a dealer perspective, a market level may be initially defined such that the dealer buys bonds from the market at 99 and sells bonds to the market at 99.50. Due to the reduction of risk, an improved market may be defined where dealer buys bonds at 99.15 and sell bonds at 99.35. In this example, a total of 15 cents multiplied by the notional size of the trading is the saving that is given to clients on the buy and sell side of the trade.

In one implementation, when price improvement is triggered, the SET server may generate improved buy/sell prices at block 630. In one implementation, the SET server may look up predefined price improvement values from a lookup table. For example, the lookup table may establish correspondence between change in price and liquidity parameters such as two-sided liquidity generated or two-sided liquidity generated in excess of the guaranteed liquidity. In another implementation, the SET server may use a predefined formula (e.g., +/−2% of the bid/ask price) to calculate the improved prices. In an alternate embodiment, when the price improvement is triggered at decision block 620, the SET server may provide the trader an opportunity to enter improved prices. At block 635, the SET server may notify the trader of the opportunity to execute trades at a better price. At block 640, improved spread and/or bid/offer prices may be obtained from the trader. At block 645, the improved bid/ask prices may be provided to the order fulfillment engine for order execution. At block 650, a notification may be sent to the client user interface to indicate that trades will be executed at improved prices. In one implementation, the notification may be in the form of an indicator or display that is turned on when price improvement is triggered. In a further implementation, the improved prices themselves may not be displayed to the client. In some implementations, only those clients who have put in an order may be notified of the new execution prices. In an alternate implementation, all clients who have joined the session may be notified of the new execution prices. While it is possible that a client may choose to cancel an order and put in a new order (e.g., larger order) to take advantage of improved execution price, the new order would risk non-execution as it would be lower in time priority.

Private-Label SET Platforms

In one embodiment, the SET platform may be offered as a private-labeled SET platform to participating dealers. Such participating dealers may customize and/or brand the SET platform as desired or as specified in any contractual agreements between the participating dealer and host dealer. Participating dealers may run trading sessions independent of the host dealer. Such dealers may be provided hardware, software and/or services (e.g., those provided by the modules of the SET system) to build, deploy, operate and manage private-labeled trading platforms and conduct private-labeled trading sessions. A subscription or other fee arrangement may be made between the host and participating dealers for the use of the SET architecture, server space, data storage and/or other facilities.

In another embodiment, the SET system may offer participating dealers an opportunity to run private-labeled trading sessions on the SET system. Such private-labeled trading sessions may be configured via a dealer user interface. In one implementation, brand data may be supplied by participating dealers to configure private-labeled trading sessions and/or private-labeled SET system. Brand data may include a logo design in a graphical file format (e.g., .ai, .eps, .gif, .jpg, .bmp, and/or the like), templates for user interface designs, display content, color schemes, other customization preferences, and/or the like. A customized trading session may be scheduled at a particular date and time and clients of a participating dealer running the session may trade in selected securities during the session. In one implementation, the SET system modules described in detail in FIG. 2 may be utilized for order capture, handling, fulfillment, clearing and settlement, and/or the like. In a further implementation, one or more of the modules 250-270 may be customized and/or modified to accommodate participating dealers and sessions conducted by such dealers. For example, the SET system with private-label facilities may include a modified user interface module 256. The modified user interface module (e.g., a branding module) may include facilities for generating customized user interfaces for clients, traders, participating dealers, sales, and/or the like using branding data. Such branding data may be stored in one or more database tables such as a branding data table.

SET Platform User Interfaces

Figure 7A:
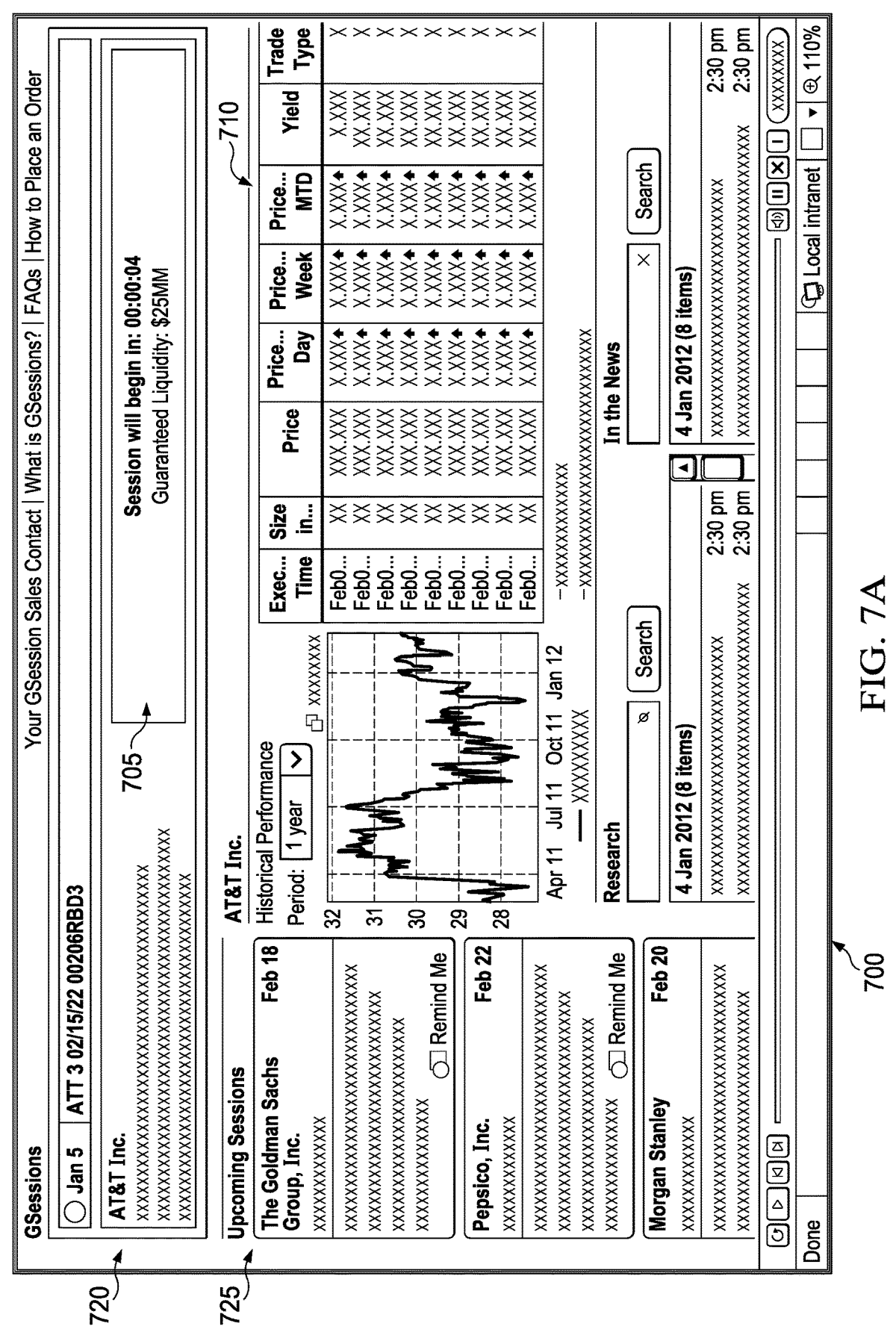
Figure 7B:
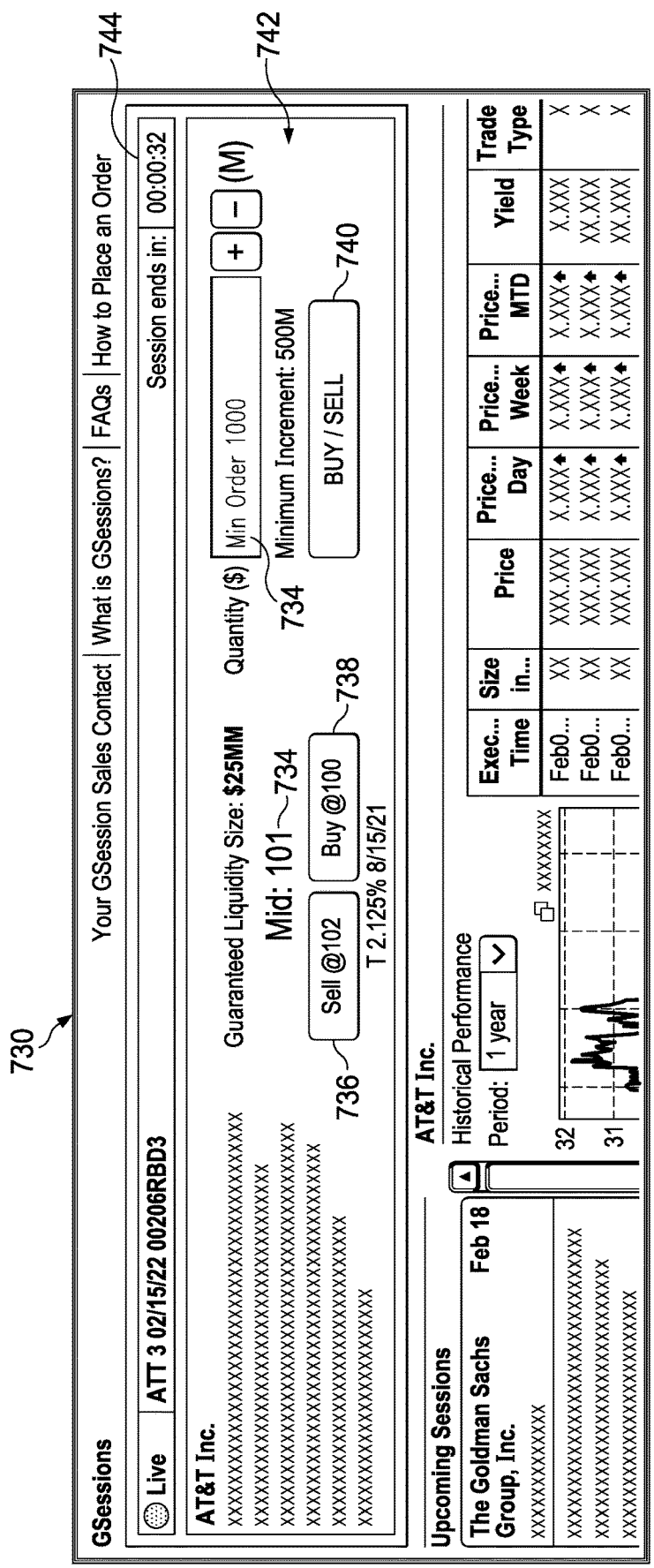

FIGS. 7A-D are screenshots illustrating client user interfaces of the SET platform. FIG. 7A shows a client user interface (UI) 700 before the start of a trading session. UI 700 may include various fields of information such as an activity bar showing trading session security information 720 (e.g., AT&T bond), an inactivated order entry panel 705 with a timer counting down the time until the start of the trading session and a guaranteed liquidity amount (e.g., $25MM) for the trading session. UI 700 may also include a session calendar 725 that displays upcoming trading sessions, a historical trading session calendar that displays the trading sessions that the user participated in the past, etc. UI 700 may also include an information area 710 which may display information on the historical performance, TRACE grid, plot tool, issuer earnings information, links to the issuer specific web pages on the portal, research tools, statistics, price chart, news, company comparisons, current company stock quote with dealer rating and dealer coverage view, dealer analyst rating on specific debt issues, and/or the like.

When the trading session begins at the scheduled time, UI 730 shown in FIG. 7B may be displayed. UI 730 may present an updated activity bar 742 that displays a two-sided market and the guaranteed liquidity. The two-sided market may be defined in terms of the mid-market level 734 (e.g., 101), sell price 736 (e.g., 102) and buy price 738 (e.g., 100). UI 730 may also display a session timer 744 that keeps track of the time left in the session to enter an order. A client may enter an order quantity in the input area 734 and select one of the sell button 736 or the buy button 738 to select a trade side. After one of the buy or sell options is selected and the quantity of orders is entered, the buy/sell button 740 may become actionable. The client may submit the order by selecting the buy/sell button 740. Once the order is submitted, UI 750 shown in FIG. 7C may be displayed. The activity bar 756 may display the size, side and price of the order submitted. The activity bar may further display an actionable cancel button 752 and an indication of remaining time to cancel the order 754. Although not shown, in one implementation, when price improvement is triggered, the activity bar may include an indicator or display to notify the client that the submitted order, if filled, will be executed at a better price.

At the conclusion of the trading session, UI 760 shown in FIG. 7D may be displayed. UI 760 may include a session indicator 762 that is turned off to indicate that the session is closed. The activity bar may include a notification (e.g., 764, 766) of any resulting execution. For example, as shown, the client may be notified whether the order was filled fully or partially, and the price at which it was filled. The activity bar may also include a session recap button that may be engaged to display to the client in an overlay 770 a report including filtered details of the trade. As shown, the trade recap may display details such as notional amount, side, CUSIP, price/spread, settlement date, trader (running the session), and the like. The trade recap may also display filtered session data such as total number of trades, total notional traded volume, imbalance transparency setting, trade imbalance, and the like.

Figure 8A:
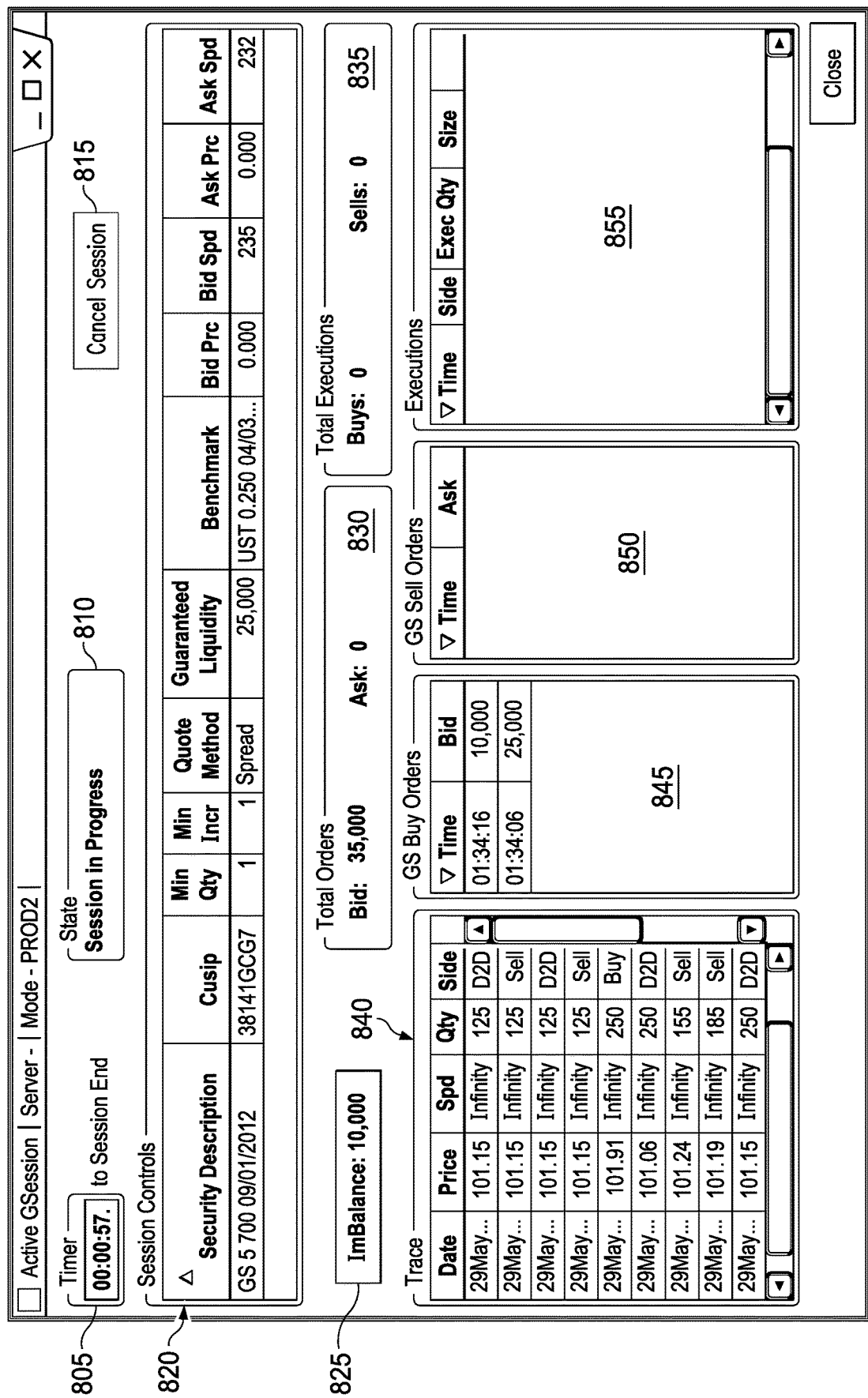
FIGS. 8A and 8B are screenshots illustrating trader user interfaces in an embodiment of the SET system.
Figure 8B:
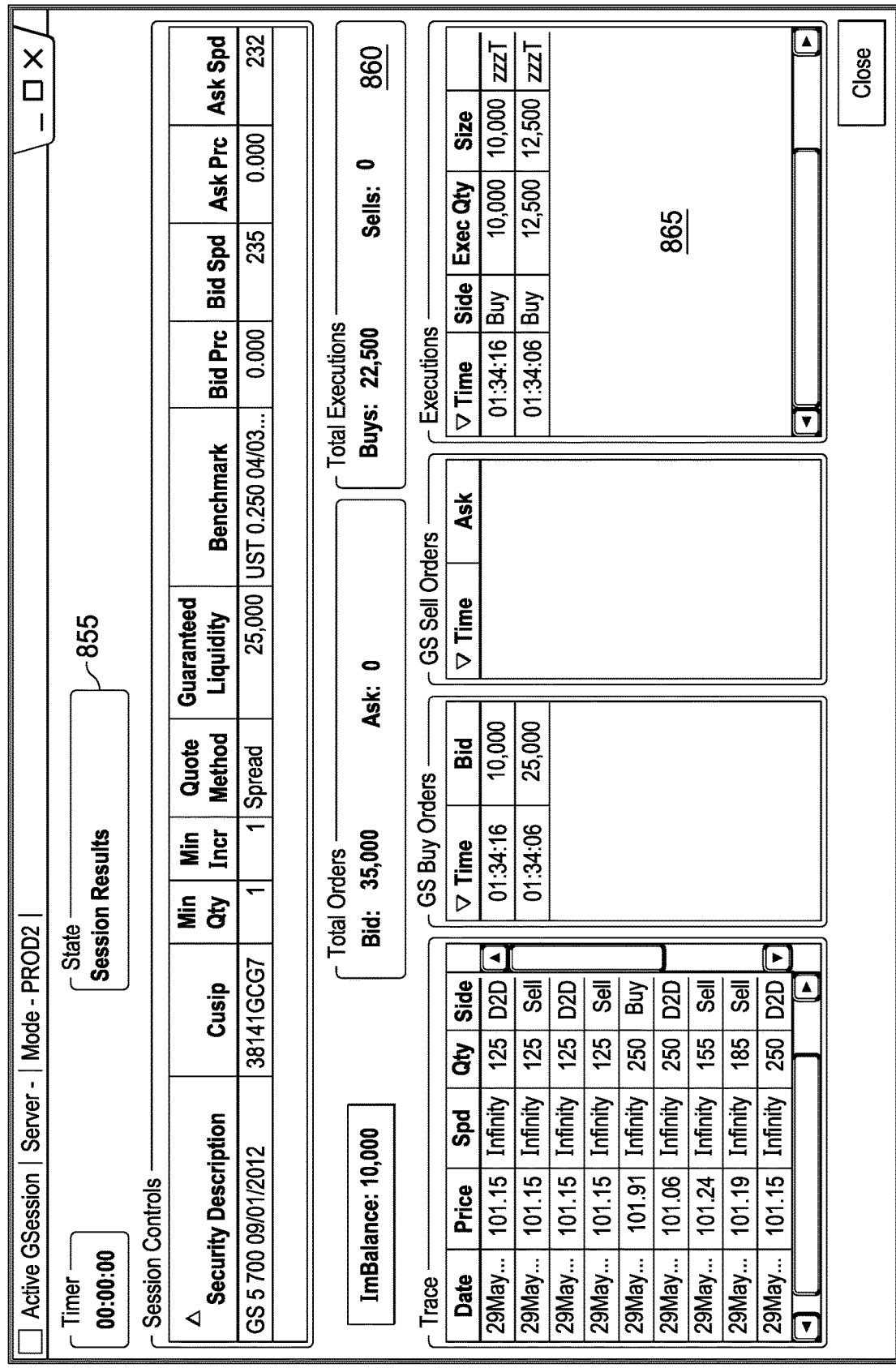

FIGS. 8A and 8B are screenshots illustrating trader user interfaces of the SET platform. Trader UI may facilitate establishment of a trading session for a given security, monitor trading session once order entry begins and display execution results at the conclusion of the trading session. Trader UI 800, as shown in FIG. 8A, may include a number of panels such as a session control panel 820, an order book or a buy order panel 845 and a sell order panel 850, an executions panel 855 and a TRACE panel 840. The session controls panel may be used to configure the session and define the market before the start of the trading session. For example, as shown, a trader may select a security for a trading session, specify minimum quantity and increments for orders, quote method, guaranteed liquidity, benchmark for the security, bid price, bid spread, ask price, ask spread, and/or the like. Buy order panel 845 may list filtered buy order information, and sell order panel 850 may list filtered sell order information received from the order handling module, for example. The executions panel 855 may list filtered execution information at the close of the trading session. The TRACE panel 840 may display TRACE data for most recent executions. UI 800 may further include a timer 805 to display the remaining time for the session to end, a state indicator 810 indicating whether the session is in progress, in results phase or waiting to start and a cancel button 815 to cancel the session at any time the trader finds it necessary. UI 800 may also include an imbalance indicator 825 that displays the amount of order imbalance in the session, a panel 830 to display the total orders on each trade side, and a panel 835 to display the total executions. At the conclusion of the trading session, a trader UI such as the one shown in FIG. 8B may be displayed to the trader. UI 850 may include a state indicator 855 updated to indicate session results. After the executions, total executions panel 860 and executions panel 865 may be updated to display the filtered execution results.

Figure 9A:
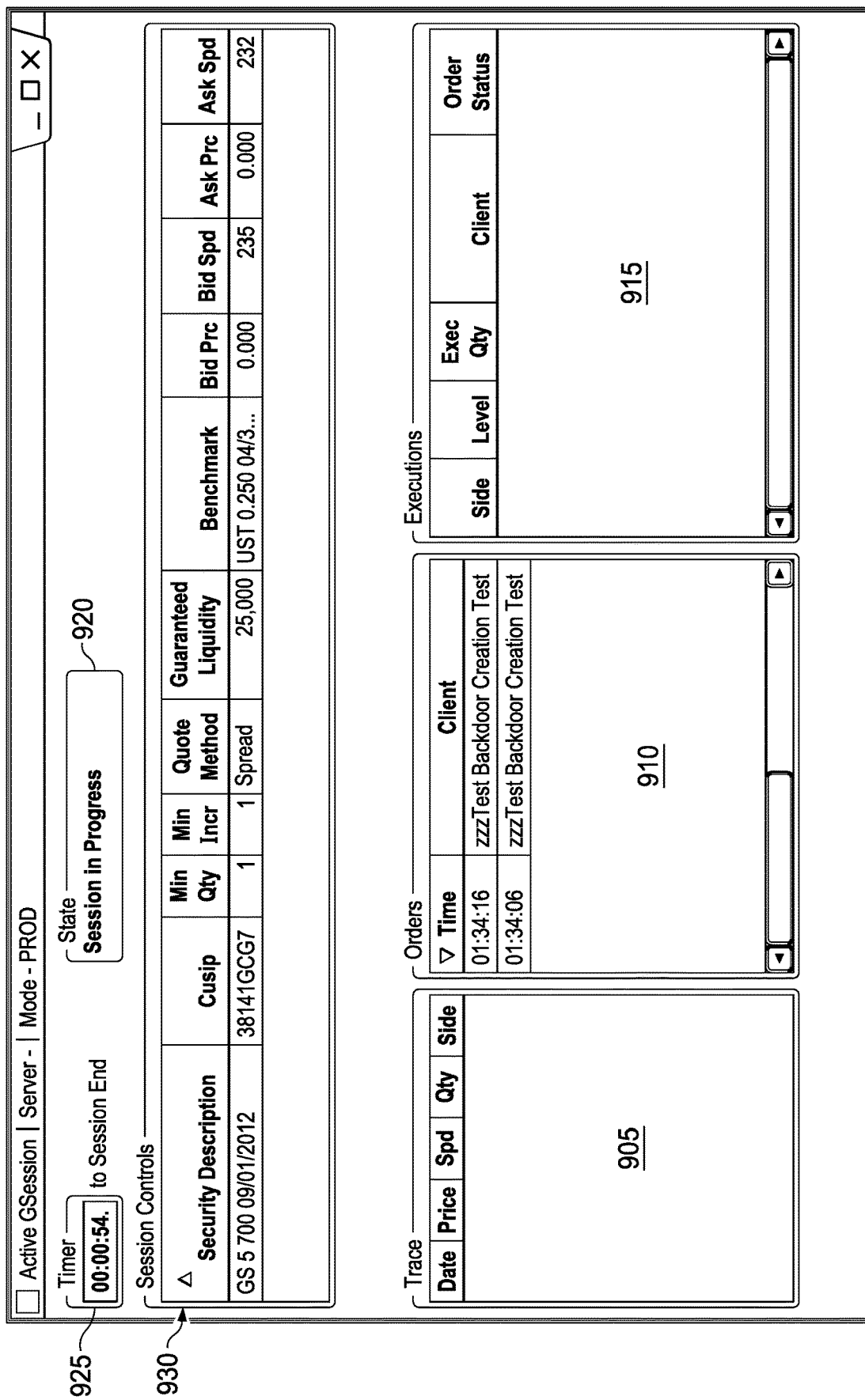
FIGS. 9A and 9B are screenshots illustrating sales user interfaces in an embodiment of the SET system.
Figure 9B:
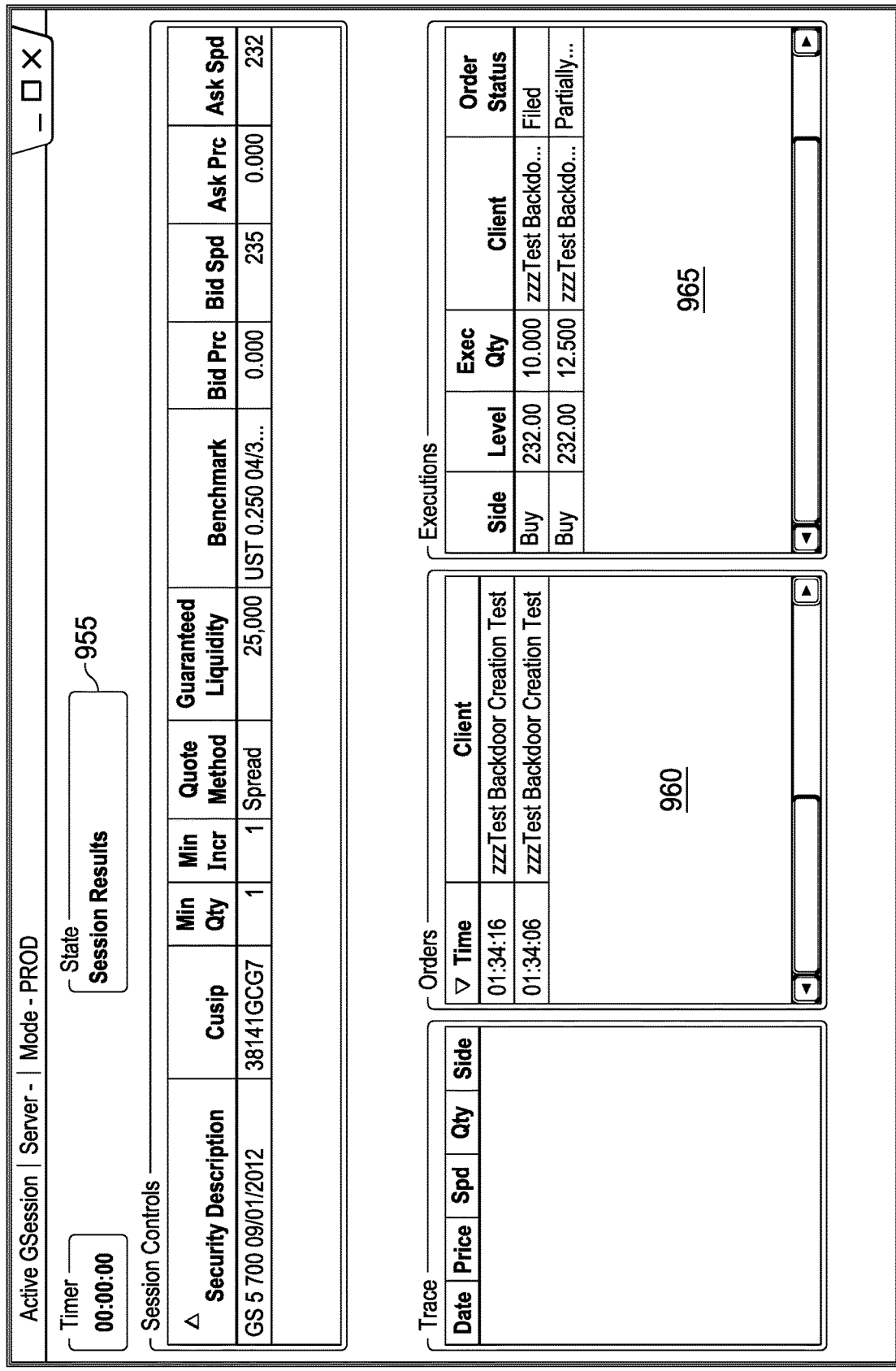

FIGS. 9A and 9B are screenshots illustrating sales user interfaces in one embodiment of the SET system. Sales UI may facilitate a sales person to market the SET system, promote client activity, submit orders on behalf of clients, and generally facilitate trading opportunities using the SET system. Sales UI 900, as shown in FIG. 9A, may include a session control panel 930, a TRACE panel 905, orders panel 910 and an executions panel 915. When the session is active, the UI may display a timer 925 to indicate time remaining for the session to end and a state indicator 920 to indicate that the session is in progress. As previously discussed, filtered order information may be provided to the sales coverage for display in the sales UI. At the conclusion of the session, UI 950, as shown in FIG. 9B, may be displayed to the sales person. UI 950 may display an updated state 955, any submitted orders in a filtered form in the orders panel 960 and any executions in the filtered form in the executions panel 965. As shown, only filled and partially filled order executions may be provided for display on the sales UI.

In some implementations, a sales person may enter orders on behalf of clients. Although not shown, the sales UI for entering orders may be substantially similar to the client UIs described with respect to FIGS. 7A-D. The order entry panel of the sales UI may include a drop down menu listing the sales person's client. The sales person may select a client from the drop down menu and place order by specifying a quantity and side.

Computer Systemization

Aspects and implementations of the SET system have been described in the general context of computer-executable instructions, such as routines executed by a general-purpose computer, a personal computer, a server, and/or other computing systems. The SET system may be embodied in a special purpose computer or data processor that is specifically programmed, configured, or constructed to perform one or more of the computer-executable instructions explained in detail above. Indeed, the terms "computer" and "computing device," as used generally herein, refer to devices that have a processor and non-transitory memory, as well as any data processor or any device capable of communicating with a network. It should be noted that the term "server" as used throughout this application refers generally to a computer, device, program, or combination thereof that processes and responds to requests from remote terminal devices operated by users across a network. The term "terminal" generally refers to a computer, program, device, user and/or combination thereof that processes and sends requests and receives and processes responses from servers across a network.

Figure 10:
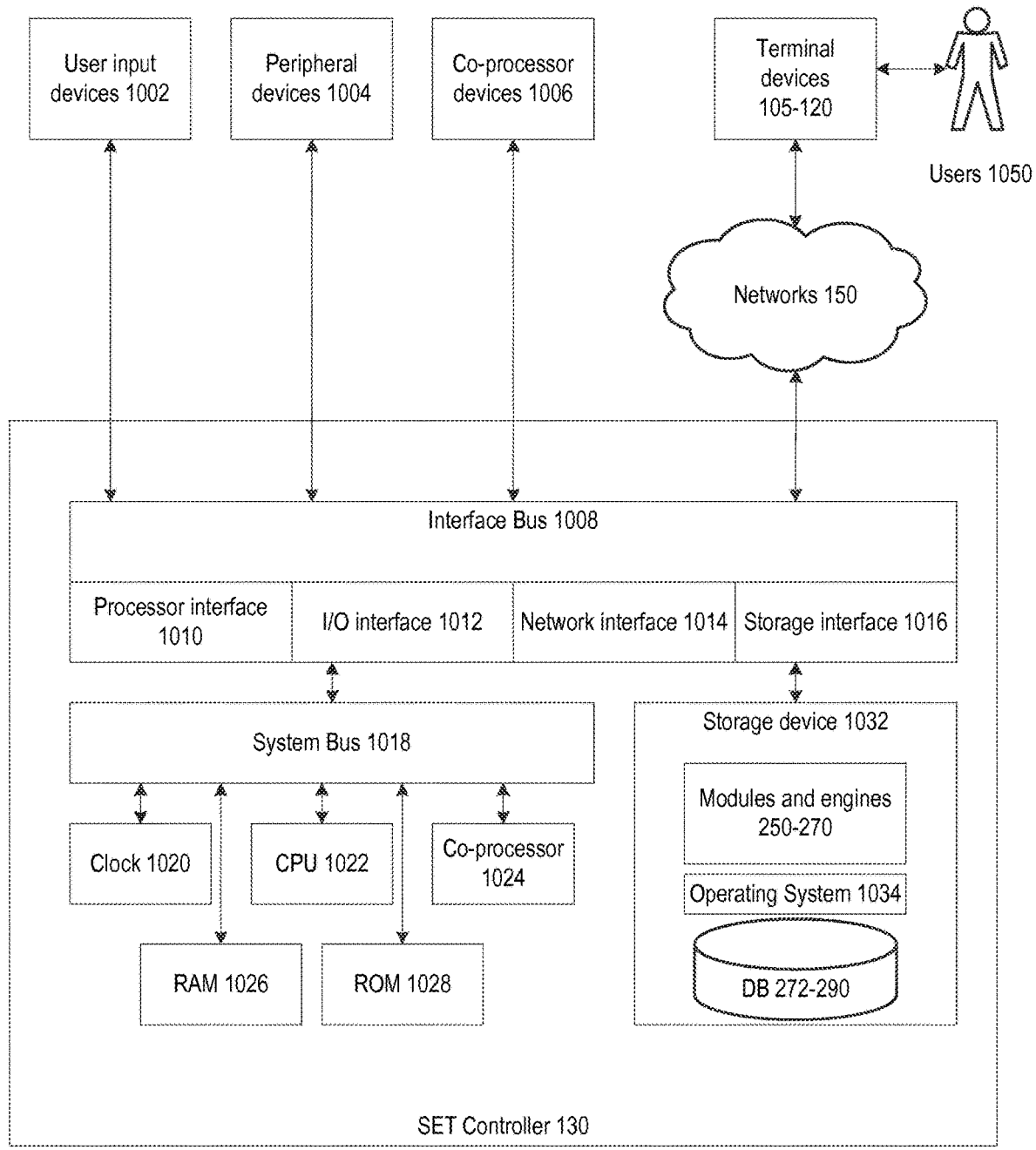
FIG. 10 is a block diagram illustrating a SET controller.

Referring to FIG. 10, a block diagram of the SET controller is shown. SET system may include SET controller 130 that may be in communication with entities including one or more users 1050, terminal devices 105-120, user input devices 1002, peripheral devices 1004, an optional co-processor device(s) (e.g., cryptographic processor devices) 1006, and networks 150. Users 1050 such as clients, traders, individual traders, sales, and others may engage with the SET controller via trading platform user interfaces that can be accessed from terminal devices 105-120. The SET system may be available as a web-based application or an application that can be installed on a terminal device.

Computers employ central processing unit (CPU) or processor (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components or modules in response to user and/or system-generated requests. One or more of these components or modules may be implemented in software, hardware or both hardware and software. Processors pass instructions (e.g., operational and data instructions) to enable various operations. The SET controller may include clock 1020, CPU 1022, memory such as read only memory (ROM) 1028 and random access memory (RAM) 1026 and co-processor 1024 among others. These controller components may be connected to a system bus 1018, and through the system bus 1018 to an interface bus 1008. Further, user input devices 1002, peripheral devices 1004, co-processor devices 1006, and the like, may be connected through the interface bus 1008 to the system bus 1018. The Interface bus 1008 may be connected to a number of interface adapters such as processor interface 1010, input output interfaces (I/O) 1012, network interfaces 1014, storage interfaces 1016, and the like.

Processor interface 1010 may facilitate communication between co-processor devices 1006 and co-processor 1024. In one implementation, processor interface 1010 may expedite encryption and decryption of requests or data. Input Output interfaces (I/O) 1012 facilitate communication between user input devices 1002, peripheral devices 1004, co-processor devices 1006, and/or the like and components of the trading server controller using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1014 may be in communication with networks 150. Through networks 150, the trading server controller may be accessible to the remote client devices. Network interfaces 1014 may use various wired and wireless connection protocols such as, direct connect, Ethernet, wireless connection such as IEEE 802.11a-x, and the like. Examples of networks 150 include the Internet, Local Area Network (LAN), Metropolitan Area Network (MAN), a Wide Area Network (WAN), wireless network (e.g., using Wireless Application Protocol WAP), a secured custom connection, and the like. Storage interfaces 1016 may be in communication with a number of storage devices such as, storage devices 1032, removable disc devices, and the like. The storage interfaces 1016 may use various connection protocols such as Serial Advanced Technology Attachment (SATA), IEEE 1394, Ethernet, Universal Serial Bus (USB), and the like.

User input devices 1002 and peripheral devices 1004 may be connected to I/O interface 1012 and potentially other interfaces, buses and/or components. User input devices 1002 may include card readers, finger print readers, joysticks, keyboards, microphones, mouse, remote controls, retina readers, touch screens, sensors, and/or the like. Peripheral devices 1004 may include antenna, audio devices (e.g., microphone, speakers, etc.), cameras, external processors, communication devices, radio frequency identifiers (RFIDs), scanners, printers, storage devices, transceivers, and/or the like. Co-processor devices 1006 may be connected to the trading server controller through interface bus 1008, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The trading server controller may employ various forms of memory including on-chip CPU memory (e.g., registers), RAM 1026, ROM 1028, and storage devices 1032. Storage devices 1032 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 1034, user interface and other modules 250-270, database tables 272-290, and the like. These components may be stored and accessed from the storage devices, including from external storage devices accessible through an interface bus. The database components 260-290 may store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, struct, structured text file (e.g., XML), table, and/or the like. Such data-structures may be stored in memory and/or in structured files.

In some implementations, the trading server controller may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the order fulfillment engine may be distributed electronically over the Internet or over other networks (including wireless networks). Those skilled in the relevant art will recognize that portions of the order fulfillment engine may reside on a server computer, while corresponding portions reside on a client computer. Data structures and transmission of data particular to aspects of the order fulfillment engine are also encompassed within the scope of the invention.

Conclusion

The above Detailed Description of embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, the SET system supports trading of more than one financial instrument in a trading session. The SET system can also support multiple trading sessions occurring at the same time. For example, two CUSIPs may be configured for trading in separate trading sessions occurring at the same time. In some embodiments, multiple dealers may organize a joint trading session for one or more securities. Furthermore, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. An electronic trading system, comprising:
   a memory; and
   a processor in communication with the memory and configured to execute a plurality of instructions that cause the processor to:
   configure a trading session of a predetermined length for a predetermined financial instrument; and
   conduct the trading session according to a guaranteed minimum notional amount of liquidity for trading in the financial instrument,
   wherein the instructions that cause the processor to conduct the trading session comprise instructions that cause the processor to:
   receive orders for the financial instrument from client terminals via a network, the client terminals associated with users of the electronic trading system;
   filter the orders based on parameters of the trading session and credentials of the users;
   aggregate the orders during an order entry phase of the trading session;
   determine from the aggregated orders total order interests on each trade side;
   trigger price improvement when the total order interests on each trade side are at least the guaranteed minimum notional amount of liquidity guaranteed by the trading session;
   generate improved prices through predefined values of a lookup table;
   provide the improved prices for order execution;
   provide a notification to each of the users of the trading session for display via a graphical user interface, the notification enabling each of the users to (i) maintain an existing order among the orders and keep priority or (ii) re-order according to the improved prices and lose priority;
   in response to the notification, receive, via the graphical user interface, a selection by a first user of the users to cancel an original order of the first user among the orders and place a new order according to the improved prices, but lose priority of the original order of the first user among the orders;
   determine a priority order of the orders, including the new order, reflecting that the first user has lost priority of the original order of the first user; and
   execute at least some of the orders according to the determined priority order, wherein a value of the executed orders equals or exceeds the guaranteed minimum notional amount of liquidity.

2. The electronic trading system of claim 1, wherein the processor is configured to execute further instructions to:
   determine characteristics of the financial instrument;
   determine changes in trading session markets over time;
   aggregate trading data from multiple trading sessions; and
   based on the characteristics of the financial instrument, the changes in the trading session markets, and the aggregated trading data, determine the guaranteed minimum notional amount of liquidity guaranteed for the trading session.

3. The electronic trading system of claim 1, wherein the orders for the financial instrument are received from a trader managing the trading session.

4. The electronic trading system of claim 3, wherein the processor is configured to execute further instructions to:
   anonymize one or more of the orders based on order handling rules for the trader; and
   provide the anonymized one or more of the orders to a user interface accessible by the trader.

5. The electronic trading system of claim 1, wherein the processor is configured to execute further instructions to:
   release offers for the financial instrument at a beginning of the order entry phase of the trading session.

6. The electronic trading system of claim 1, wherein one or more of the orders are executed against a dealer of the financial instrument.

7. The electronic trading system of claim 1, wherein one or more of the orders are crossed against each other.

8. The electronic trading system of claim 1, wherein the processor is configured to execute further instructions to:
   filter each of one or more of the orders based on order handling rules for sales coverage; and
   provide each of the filtered one or more of the orders to a user interface accessible by a sales person associated with the corresponding order.

9. The electronic trading system of claim 1, wherein the processor is configured to execute further instructions to:
   receive session parameters including a selection of the financial instrument and the guaranteed minimum notional amount of liquidity guaranteed by the trading session.

10. The electronic trading system of claim 1, wherein the processor is configured to execute further instructions to:
    determine during the trading session that there is not enough counter liquidity to execute one or more of the orders; and
    provide liquidity during the trading session to ensure the guaranteed minimum notional amount of liquidity,
    wherein one or more of the orders are executed during the trading session using the guaranteed minimum notional amount of liquidity.

11. The electronic trading system of claim 1, wherein the original order of the first user is executed at a new bid or a new ask that generates a saving for a customer associated with the first user.

12. The electronic trading system of claim 1, wherein the processor is configured to execute further instructions to:
    generate session data from the orders and execution of one or more of the orders;
    obtain an information transparency setting; and
    select, based on the information transparency setting, a portion of the session data for transmission.

13. The electronic trading system of claim 12, wherein the processor is configured to execute further instructions to:
    identify a session participant qualified to receive the session data; and
    transmit the selected portion of the session data to the qualified session participant.

14. A processor-implemented electronic trading method, comprising:
    configuring a trading session of a predetermined length and for a predetermined financial instrument; and conducting the trading session according to a guaranteed minimum notional amount of liquidity for trading in the financial instrument, wherein conducting the trading session comprises:
receiving orders for the financial instrument from client terminals via a network, the client terminals associated with users of an electronic trading system;
filtering the orders based on parameters of the trading session and credentials of the users;
aggregating the orders during an order entry phase of the trading session;
determining from the aggregated orders total order interests on each trade side;
triggering price improvement when the total order interests on each trade side are at least the guaranteed minimum notional amount of liquidity guaranteed by the trading session;
generating improved prices through predefined values of a lookup table;
providing the improved prices for order execution;
providing a notification to each of the users of the trading session for display via a graphical user interface, the notification enabling each of the users to (i) maintain an existing order among the orders and keep priority or (ii) re-order according to the improved prices and lose priority;
in response to the notification, receiving, via the graphical user interface, a selection by a first user of the users to cancel an original order of the first user among the orders and place a new order according to the improved prices, but lose priority of the original order of the first user among the orders;
determining a priority order of the orders, including the new order, reflecting that the first user has lost priority of the original order of the first user; and
executing at least some of the orders according to the determined priority order, wherein a value of the executed orders equals or exceeds the guaranteed minimum notional amount of liquidity.

15. The method of claim 14, wherein:
the trading session is managed by a dealer of the financial instrument; and
the orders are received from customers participating in the trading session.

16. The method of claim 14, wherein the orders for the financial instrument are received from a trader managing the trading session.

17. The method of claim 16, further comprising:
anonymizing one or more of the orders based on order handling rules for the trader; and
providing the anonymized one or more of the orders to a user interface accessible by the trader.

18. The method of claim 14, further comprising:
releasing offers for the financial instrument at a beginning of the order entry phase of the trading session.

19. The method of claim 14, wherein one or more of the orders are executed against a dealer of the financial instrument.

20. The method of claim 14, wherein one or more of the orders are crossed against each other.

21. The method of claim 14, further comprising:
filtering each of one or more of the orders based on order handling rules for sales coverage; and
providing each of the filtered one or more of the orders to a user interface accessible by a sales person associated with the corresponding order.

22. The method of claim 14, further comprising:
receiving session parameters including a selection of the financial instrument and the guaranteed minimum notional amount of liquidity guaranteed by the trading session.

23. The method of claim 14, further comprising:
determining during the trading session that there is not enough counter liquidity to execute one or more of the orders; and
providing liquidity during the trading session to ensure the guaranteed minimum notional amount of liquidity, wherein one or more of the orders are executed during the trading session using the guaranteed minimum notional amount of liquidity.

24. The method of claim 14, wherein the original order of the first user is executed at a new bid or a new ask that generates a saving for a customer associated with the first user.

25. The method of claim 14, further comprising:
generating session data from the orders and execution of one or more of the orders;
obtaining an information transparency setting; and
selecting, based on the information transparency setting, a portion of the session data for transmission.

26. The method of claim 25, further comprising:
identifying a session participant qualified to receive the session data; and
transmitting the selected portion of the session data to the qualified session participant.

27. A processor-readable non-transient medium storing instructions that, when executed by a processor, cause the processor to:
configure a trading session of a predetermined length for a predetermined financial instrument; and
conduct the trading session according to a guaranteed minimum notional amount of liquidity for trading in the financial instrument;
wherein the instructions that cause the processor to conduct the trading session comprise instructions that cause the processor to:
receive orders for the financial instrument from client terminals via a network, the client terminals associated with users of an electronic trading system;
filter the orders based on parameters of the trading session and credentials of the users;
aggregate the orders during an order entry phase of the trading session;
determine from the aggregated orders total order interests on each trade side;
trigger price improvement when the total order interests on each trade side are at least the guaranteed minimum notional amount of liquidity guaranteed by the trading session;
generate improved prices through predefined values of a lookup table;
provide the improved prices for order execution;
provide a notification to each of the users of the trading session for display via a graphical user interface, the notification enabling each of the users to (i) maintain an existing order among the orders and keep priority or (ii) re-order according to the improved prices and lose priority;
in response to the notification, receive, via the graphical user interface, a selection by a first user of the users to cancel an original order of the first user among the orders and place a new order according to the improved prices, but lose priority of the original order of the first user among the orders;

determine a priority order of the orders, including the new order, reflecting that the first user has lost priority of the original order of the first user; and execute at least some of the orders according to the determined priority order, wherein a value of the executed orders equals or exceeds the guaranteed minimum notional amount of liquidity.

\* \* \* \* \*